US005759967A

United States Patent [19]

Song et al.

[11] Patent Number: 5,759,967
[45] Date of Patent: Jun. 2, 1998

[54] ETHYLENE α-OLEFIN/DIENE INTERPOLYMER-SUBSTITUTED CARBOXYLIC ACID DISPERSANT ADDITIVES

[75] Inventors: Won R. Song, Short Hills; Albert Rossi, Warren, both of N.J.; Howard W. Turner, Houston, Tex.; Howard C. Welborn, deceased, John L. Zipprich, executor; Robert D. Lundberg, Williamsburg, Va.; Antonio Gutierrez, Mercerville; Robert A. Kleist, Bayonne, both of N.J.

[73] Assignee: Exxon Chemical Patents Inc, Linden, N.J.

[21] Appl. No.: 876,789

[22] Filed: Jun. 16, 1997

Related U.S. Application Data

[60] Division of Ser. No. 434,084, May 3, 1995, Pat. No. 5,681,799, which is a continuation-in-part of Ser. No. 263,291, Jun. 21, 1994, Pat. No. 5,435,926, which is a division of Ser. No. 132,028, Oct. 5, 1993, Pat. No. 5,350,532, which is a division of Ser. No. 984,727, Dec. 4, 1992, Pat. No. 5,266,223, which is a continuation of Ser. No. 769,041, Sep. 30, 1991, abandoned, which is a division of Ser. No. 473,624, Feb. 1, 1990, abandoned, which is a continuation-in-part of Ser. No. 226,759, Aug. 1, 1988, abandoned.

[51] Int. Cl.$^6$ .................................................. C10M 129/95
[52] U.S. Cl. ........................ 508/454; 508/507; 508/466; 525/337; 525/348
[58] Field of Search ....................... 508/454, 466, 508/507; 525/337, 348

[56] References Cited

U.S. PATENT DOCUMENTS

| | | | |
|---|---|---|---|
| 3,316,177 | 4/1967 | Dorer, Jr. | 252/51.5 |
| 3,326,804 | 6/1967 | Hu | 252/34 |
| 3,563,964 | 2/1971 | Wagensommer | 260/80.78 |
| 3,697,429 | 10/1972 | Engel et al. | 252/59 |
| 3,819,592 | 6/1974 | Visser et al. | 260/80.78 |
| 3,896,094 | 7/1975 | Visser et al. | 260/80.78 |
| 3,896,096 | 7/1975 | Visser et al. | 260/80.78 |
| 4,089,794 | 5/1978 | Engel et al. | 252/51.5 A |
| 4,137,185 | 1/1979 | Gardiner et al. | 252/51.5 A |
| 4,144,181 | 3/1979 | Elliott et al. | 252/33 |
| 4,152,499 | 5/1979 | Boerzel et al. | 526/52.4 |
| 4,160,739 | 7/1979 | Stambaugh et al. | 252/34 |
| 4,161,452 | 7/1979 | Stambaugh et al. | 252/34 |
| 4,171,273 | 10/1979 | Waldbillig et al. | 252/51.5 A |
| 4,198,327 | 4/1980 | Matsumoto et al. | 260/4 |
| 4,219,432 | 8/1980 | Girgenti et al. | 252/51.5 A |
| 4,234,435 | 11/1980 | Meinhardt et al. | 252/51.5 A |
| 4,245,061 | 1/1981 | Tachi et al. | 525/286 |
| 4,306,041 | 12/1981 | Cozewith et al. | 526/65 |
| 4,357,250 | 11/1982 | Hayashi . | |
| 4,507,515 | 3/1985 | Johnston et al. | 585/12 |
| 4,517,104 | 5/1985 | Bloch et al. | 252/51.5 A |
| 4,540,753 | 9/1985 | Cozewith et al. | 526/88 |
| 4,542,199 | 9/1985 | Kaminsky et al. . | |
| 4,557,847 | 12/1985 | Gutierrez et al. | 252/51.5 A |
| 4,575,574 | 3/1986 | Kresge et al. | 585/520 |
| 4,632,769 | 12/1986 | Gutierrez et al. | 252/48.6 |
| 4,666,619 | 5/1987 | Kresge et al. | 252/56 S |
| 4,668,834 | 5/1987 | Rim et al. | 585/12 |
| 4,693,838 | 9/1987 | Varma et al. | 252/51.5 R |
| 4,704,491 | 11/1987 | Tsutsui et al. | 585/10 |
| 4,707,285 | 11/1987 | Brewster | 252/50 |
| 4,749,504 | 6/1988 | Aihara et al. | 252/49.5 |
| 4,749,505 | 6/1988 | Chung et al. | 252/51.5 A |
| 4,767,806 | 8/1988 | Cesare et al. | 523/514 |
| 4,780,228 | 10/1988 | Gardiner et al. | 252/56 R |
| 4,803,003 | 2/1989 | Chung | 252/56 R |
| 4,804,794 | 2/1989 | Ver Strate et al. | 585/12 |
| 4,863,623 | 9/1989 | Nalesnik . | |
| 4,863,624 | 9/1989 | Emert et al. | 252/51.5 A |
| 4,877,557 | 10/1989 | Kaneshige et al. | 252/56 |
| 4,888,393 | 12/1989 | Cesare et al. . | |
| 4,900,461 | 2/1990 | Ver Strate et al. | 252/49.6 |

(List continued on next page.)

FOREIGN PATENT DOCUMENTS

| | | |
|---|---|---|
| 2021959 | 6/1991 | Canada . |
| 0 128 046 | 12/1984 | European Pat. Off. . |
| 0 129 368 | 12/1984 | European Pat. Off. . |
| 0 257 696 | 3/1988 | European Pat. Off. . |
| 0 305 022 | 3/1989 | European Pat. Off. . |
| 0 441 548 | 2/1991 | European Pat. Off. . |
| 62-0 129 303 | 6/1987 | Japan . |
| 3 131 612 | 10/1989 | Japan . |
| 1 313 508 | 12/1989 | Japan . |
| 2 200 395 | 8/1990 | Japan . |
| WO88/01626 | 3/1988 | WIPO . |
| WO90/01503 | 2/1990 | WIPO . |
| WO91/11488 | 8/1991 | WIPO . |
| WO94/13761 | 6/1994 | WIPO . |
| WO95/24431 | 9/1995 | WIPO . |
| WO95/34615 | 12/1995 | WIPO . |

OTHER PUBLICATIONS

Bogdanov, M. V. and O. L. Glavati, "Odixative Thermal Degradation of Alkenylsuccinic Anhydrides", Neftehimiya 13:743–748, 1973 (English Trans.) Month Unavailable.

BP Chemicals International Ltd. Technical Booklet No. HB102/4; "Hyvis Polybutenes" (Aug. 1973, reprinted Aug. 1975).

"Hyvis Polybutenes as Chemical Reactants", Technical Service Note, Chemical Reactions 1, BP Chemicals (undated).

*Primary Examiner*—Jacqueline V. Howard
*Attorney, Agent, or Firm*—K. R. Walton

[57] ABSTRACT

The present invention is directed to an oil-soluble lubricating oil additive comprising at least one terminally unsaturated ethylene/alpha-olefin/diene interpolymer of 300 to 20,000 number average molecular weight substituted with mono- or dicarboxylic acid producing moieties (preferably dicarboxylic acid or anhydride moieties), wherein the terminal unsaturation comprises terminal ethenylidene unsaturation. The mono- and dicarboxylic acid or anhydride substituted interpolymers of this invention are useful per se as additives to lubricating oils, and can also be reacted with a nucleophilic reagent, such s amines, alcohols, amino alcohols and reactive metal compounds, to form products which are also useful lubricating oil additives, e.g., as dispersants.

9 Claims, No Drawings

U.S. PATENT DOCUMENTS

| | | | |
|---|---|---|---|
| 4,908,411 | 3/1990 | Kinoshita et al. | 525/285 |
| 4,931,517 | 6/1990 | Fujita . | |
| 4,956,107 | 9/1990 | Gutierrez et al. | 252/51.5 A |
| 5,017,299 | 5/1991 | Gutierrez et al. | 252/51.5 A |
| 5,043,515 | 8/1991 | Slaugn et al. . | |
| 5,053,151 | 10/1991 | Chung et al. | 252/51.5 A |
| 5,075,383 | 12/1991 | Migdal et al. | 525/293 |
| 5,229,022 | 7/1993 | Song et al. | 252/56 R |
| 5,266,223 | 11/1993 | Song et al. | 252/51.5 A |
| 5,284,595 | 2/1994 | Emert et al. | 252/49.6 |
| 5,350,532 | 9/1994 | Song et al. | 252/49.6 |
| 5,681,799 | 10/1997 | Song et al. | 528/454 |

ETHYLENE α-OLEFIN/DIENE INTERPOLYMER-SUBSTITUTED CARBOXYLIC ACID DISPERSANT ADDITIVES

This is a division of U.S. Ser. No. 08/434,084, filed May 3, 1995, now U.S. Pat. No. 5,681,799 which is a continuation-in-part of U.S. Ser. No. 08/263,291, filed Jun. 21, 1994, now U.S. Pat. No. 5,435,926, which is a division of U.S. Ser. No. 08/132,028, filed Oct. 5, 1993, now U.S. Pat. No. 5,350,532, which is a division of U.S. Ser. No. 07/984,727, filed Dec. 4, 1992, now U.S. Pat. No. 5,266,223 which is a continuation of U.S. Pat. No. 07/769,041, filed Sep. 30, 1991, now abandoned, which is a division of U.S. Ser. No. 07/473,624, filed Feb. 1, 1990, now abandoned, which is a continuation-in-part of U.S. Ser. No. 07/226,759, filed Aug. 1, 1988, now abandoned.

FIELD OF THE INVENTION

This invention relates to improved oil soluble dispersant additives useful in oleaginous compositions, including fuels and lubricating oil compositions, and to concentrates containing said additives.

BACKGROUND OF THE INVENTION

Ashless nitrogen and ester containing lubricating oil dispersants have been widely used by the industry. Typically, these dispersants are prepared from a long chain hydrocarbon polymer by reacting the polymer with maleic anhydride to form the corresponding polymer which is substituted with succinic anhydride groups. Polyisobutylene has been widely used as the polymer of choice, chiefly because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

The polyisobutylene polymers (PIB) employed in most conventional dispersants are based on a hydrocarbon chain of a number average molecular weight ($\overline{M}_n$) of from about 900 to about 2500. PIB having a $\overline{M}_n$ of less than about 300 gives rather poor performance results when employed in dispersants because the molecular weight is insufficient to keep the dispersant molecule fully solubilized in lubricating oils. On the other hand, high molecular weight PIB ($\overline{M}_n$>3000) becomes so viscous that conventional industrial practices are incapable of handling this product in many operations. This problem becomes much more severe as the PIB molecular weight increases to 5000 or 10,000.

Increased amounts of terminal ethylenic unsaturation in polyisobutylene (so-called "reactive polyisobutylene") has been achieved by $BF_3$ catalyzed polymerization of isobutylene. Exemplary of references disclosing these polymers is U.S. Pat. No. 4,152,499. However, such reactive polyisobutylene materials can still contain substantial amounts of unsaturation elsewhere along the chain. Further, it is difficult to produce such reactive polyisobutylene polymers at molecular weights of greater than about 2,000, and, even so, the reactive polyisobutylenes themselves still suffer the above-noted viscosity increase disadvantages as molecular weights are increased.

Other polymers, such as ethylene-propylene co-polymers and terpolymers containing non-conjugated dienes, have been disclosed as suitable polymers for the preparation of ashless nitrogen and ester dispersants.

U.S. Pat. No. 4,234,435, for example, discloses dispersants prepared from polyalkenes, $\overline{M}_n$ of 1,300 to about 5,000. The polyalkene can comprise homopolymers or interpolymers of $C_2$ to $C_{16}$ terminal olefins, of which ethylene-propylene copolymers are said to be examples, with specific reference to a copolymer of 80% ethylene and 20% propylene.

However, ethylene-alpha-olefin copolymers of the above molecular weights could be produced using Ziegler-Natta catalysts only in combination with $H_2$ as molecular weight control in order to terminate the growing copolymer chains within this molecular weight range. Without use of $H_2$ or other conventional, so-called "chain stoppers", the copolymers produced with Ziegler-Natta catalysts would tend to have molecular weights greatly in excess of the above range. (Such higher copolymers, for example, are widely employed in ungrafted form as viscosity index improvers, and when grafted with nitrogen-containing groups, as described below, are conventionally employed as dispersant-viscosity index improver polymers.) The use of $H_2$ as a chain stopper has the disadvantage of causing the saturation of the olefinic double bond content of the copolymer. Thus, while lower molecular weight copolymers were theoretically possible to prepare, their low unsaturation content (and the accompanying low graft copolymer yields) would have made their further functionalization by a thermal "ene" reaction, e.g., with dicarboxylic acid moieties in preparing dispersants, highly unattractive.

High molecular weight ethylene-propylene polymers and ethylene-propylene-diene terpolymers, having viscosity average molecular weights of from about 20,000 to 300,000, are generally produced employing Ziegler catalysts, generally $VCl_4$ or $VOCl_3$ with a halide source, such as organoaluminum halides and/or hydrogen halides. Such high molecular weight EP and EPDM polymers find use as viscosity index improvers. See, e.g., U.S. Pat. Nos. 3,563,964; 3,697,429; 4,306,041; 4,540,753; 4,575,574; and 4,666,619.

The concept of derivatizing V.I. improving high molecular weight ethylene copolymers, with acid moieties such as maleic anhydride, followed by reaction with an amine, to form a V.I.-dispersant oil additive is known in the art as indicated by the following patents.

U.S. Pat. No. 3,316,177 teaches ethylene copolymers of at least 50,000, such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer, which is grafted with maleic anhydride followed by reaction with polyalkylene polyamines. Preferred are ethylene-propylene copolymers, having $\overline{M}_v$ from 100,000 to 500,000, prepared by Ziegler type catalysts.

U.S. Pat. No. 4,160,739 teaches an ethylene copolymer ($\overline{M}_v$=10,000 to 200,000) which is grafted, using a free radical technique, with alternating maleic anhydride and a second polymerizable monomer such as methacrylic acid, which materials are reacted with an amine having a single primary, or a single secondary, amine group.

U.S. Pat. No. 4,161,452 relates to graft copolymers wherein the backbone polymer is a polymeric hydrocarbon such as EP copolymer or EPDM ($\overline{M}_v$=10,000 to 200,000) and the grafted units are the residues of an addition copolymerizable monomer system comprising, e.g., maleic anhydride, and at least one other addition monomer.

U.S. Pat. No. 4,171,273 reacts an ethylene copolymer ($\overline{M}_v$=10,000 to 100,000) with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,517,104 relates to EP and EPDM viscosity index improver-dispersant additives prepared from EP polymer ($\overline{M}_n$=5000 to 500,000), by maleic anhydride grafting and reaction with polyamines.

The following references include disclosures of EP/EPDM polymers of $\overline{M}_n$ of 700/500,000, also prepared by conventional Ziegler catalysts.

U.S. Pat. No. 4,089,794 teaches grafting the ethylene copolymer ($\overline{M}_n$=700 to 500,000) with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ monocarboxylic acid anhydrides, and dicarboxylic anhydrides, such as acetic anhydride, succinic anhydride, etc., with an ethylene copolymer ($\overline{M}_n$=700 to 500,000) reacted with maleic anhydride and a polyalkylene polyamine to inhibit cross linking and viscosity increase due to further reaction of any primary amine groups which were initially unreacted.

U.S. Pat. No. 4,144,181 is similar to 4,137,185 in that it teaches using a sulfonic acid to inactivate the remaining primary amine groups when a maleic anhydride grafted ethylene-propylene copolymer ($\overline{M}_n$=700 to 500,000) is reacted with a polyamine.

U.S. Pat. No. 4,219,432 teaches maleic anhydride grafted ethylene copolymer ($\overline{M}_n$=700 to 500,000) reacted with a mixture of an amine having only one primary group together with a second amine having two or more primary groups.

Related disclosures of maleic anhydride grafted, aminated ethylene-propylene polymer viscosity improver-dispersant additives useful in lubricating oil compositions are contained in U.S. Pat. Nos. 4,507,515; 4,557,847; 4,632,769; 4,693,838; and 4,707,285.

U.S. Pat. No. 4,668,834 to Uniroyal Chemical discloses preparation (via certain metallocene and alumoxane catalyst systems) and composition of ethylene-alpha olefin copolymers and terpolymers having vinylidene-type terminal unsaturation, which are disclosed to be useful as intermediates in epoxy-grafted encapsulation compositions.

U.S. Pat. No. 4,704,491 to Mitsui Petrochemical relates to liquid ethylene alpha-olefin random copolymers, useful when hydrogenated as synthetic lubricant oil, characterized inter alia by having 10-85 mol. % ethylene units, 15-90 mol. % alpha-olefin units, $\overline{M}_n$ of from 300 to 10,000 and a $\overline{M}_w/\overline{M}_n$ of not more than 2.5. The patent also indicates that the liquid copolymer can be easily modified since it has a double bond capable of reacting with maleic anhydride, etc., at the molecular chain ends.

Japanese Published Patent Application 87-129,303A of Mitsui Petrochemical relates to narrow molecular weight distribution ($\overline{M}_w/\overline{M}_n$<2.5) ethylene alpha-olefin copolymer waxes containing 85-99 mol % ethylene, which are disclosed to be used for dispersing agents, modifiers lo or materials to produce toners. The copolymers (having crystallinity of from 5-85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 A1 relates to a process for dimerizing alpha-olefins using a catalyst comprising certain metallocene/alumoxane systems.

European Patent Publication 305,022-A1 to Mitsui Petrochemical relates to certain synthetic hydrocarbon lubricating oil compositions containing a load-withstanding additive and a liquid ethylene alpha-olefin random copolymer modified by graft copolymerization with an unsaturated carboxylic acid or derivative thereof (e.g., maleic anhydride). The ethylene alpha-olefin copolymers ($\overline{M}_n$ of 300 to 12,000) are obtained using Ziegler catalysts (e.g., catalyst formed from soluble V compound and an organo aluminum compound), are grafted in the presence of a free radical initiator.

PCT Published Patent Application WO 88/01626 relates to transition metal compound/alumoxane catalysts for polymerizing alpha-olefins.

SUMMARY OF THE INVENTION

The present invention is a functionalized polymer comprising an ethylene/alpha-olefin/diene interpolymer substituted with monounsaturated mono- or dicarboxylic acid-producing moieties, said interpolymer having (i) monomer units derived from ethylene, at least one alpha-olefin of the formula $H_2C=CHR^1$ wherein $R^1$ is a $C_1$–$C_{18}$ alkyl group, and at least one diene monomer; (ii) an $\overline{M}_n$ of about 300–20,000; (iii) at least about 30% of its chains with ethenylidene terminal unsaturation; and (iv) less than 5 wt. % polymer fraction of $\overline{M}_n$ less than about 300:

said functionalized polymer having a VR value of less than about 4.1.

The present invention is an oil-soluble dispersant adduct of: (a) an ethylene/alpha-olefin/diene interpolymer substituted with monounsaturated mono- or di-carboxylic acid-producing moieties, said interpolymer having: (i) monomer units derived from ethylene, at least one alpha-olefin of the formula $H_2C=CHR^1$ wherein $R^1$ is $C_1$–$C_{18}$ alkyl group, and at least one diene monomer; (ii) a $\overline{M}_n$ of about 300–20,000; and at least about 30% of its chains with ethylidene terminal unsaturation; and (b) at least one nucleophilic reagent selected from the group consisting of amines, alcohols, metal reactants, and mixtures thereof.

The present invention is directed to an oil-soluble lubricating oil additive comprising ethylene alpha-olefin interpolymers of 300 to 20,000 number average molecular weight terminally substituted with mono- or dicarboxylic acid producing moieties (preferably acid or anhydride moieties), wherein the ethylene alpha-olefin polymer group is derived from a terminally unsaturated ethylene alpha-olefin polymer wherein the terminal unsaturation comprises ethenylidene unsaturation. The monocarboxylic acid and the dicarboxylic acid or anhydride substituted polymers of this invention are useful per se as additives to oleaginous compositions, such as fuels or lubricating oils, and can also be reacted with a nucleophilic reagent, such as amines, alcohols, amino alcohols and metal compounds, to form derivative products which are also useful as additives to oleaginous compositions, such as, e.g., fuel additives or lubricating oil additives, e.g., as dispersants.

The materials of the invention are different from the prior art because of their effectiveness and their ability to provide enhanced lubricating oil dispersancy, as exhibited by their enhanced sludge and varnish control properties. In fuels, the additives serve to minimize the degree of carburetor and fuel injector fouling from deposits. In addition, the additives of this invention possess superior viscometric properties.

The process of this invention permits the preparation of lubricating oil and fuel dispersant additives which are simultaneously characterized by a high active ingredient content (usually at least about 60 wt. %, up to about 95 wt. %) and by advantageous viscosity properties to permit the additives to be readily handled. In addition, the ethylene alpha-olefin polymers substituted by mono- and di-carboxylic acid producing moieties of this invention can be characterized by VR values (as hereinafter defined) of not greater than about 4.1, thereby providing advantageous viscosity modifying properties to the lubricating oils containing them. The present invention can produce such substituted polymers in a highly concentrated form as substantially halogen free materials, thereby reducing the corrositivity processing difficulties and environmental concerns which are associated with halogen-containing lubricating oil additives.

Further, dispersant materials can be prepared from the substituted polymers of this invention to provide fuel and lubricating oil dispersant products having VR' values of not greater than about 4.1 and VR'/VR$_r$ ratios of less than about 1.11 (as such values and ratios are hereinafter defined). Surprisingly, the process of this invention permits the preparation of highly concentrated, substantially halogen-free dispersants from high molecular weight ethylene-alpha-olefin polymers ($\overline{M}_n$>5000, e.g., 5,500–20,000) of superior viscosity properties.

DETAILED DESCRIPTION OF THE INVENTION

Preparation of Ethylene Alpha-olefin Polymer

The polymers employed in this invention are polymers of ethylene and at least one alpha-olefin having the formula $H_2C=CHR^1$ wherein $R^1$ is straight chain or branched chain alkyl radical comprising 1 to 18 carbon atoms and wherein the polymer contains a high degree of terminal ethenylidene unsaturation. Preferably $R^1$ in the above formula is alkyl of from 1 to 8 carbon atoms, and more preferably is alkyl of from 1 to 2 carbon atoms. Therefore, useful comonomers with ethylene in this invention include propylene, 1-butene, hexene-1, octene-1,4-methylpentene-1, decene-1, dodecene-1, tridecene-1, tetradecene-1, pentadecene-1, hexadecene-1, heptadecene-1, octadecene-1, nonadecene-1 and mixtures thereof (e.g., mixtures of propylene and 1-butene, and the like).

The polymers employed in this invention are also diene interpolymers, especially terpolymers of ethylene, at least one alpha-olefin having the formula $H_2C=CHR^1$ wherein $R^1$ is straight chain or branched chain alkyl radical conveniently comprising 1 to 18 carbon atoms, and at least one diene monomer, wherein the polymer contains a high degree of terminal ethenylidene unsaturation (in addition to any other unsaturation provided by diene incorporation). Examples of such polymers are ethylene/propylene/cyclopentadiene interpolymers, especially terpolymers; ethylene/propylene/5-ethylidene-2-norbornene interpolymers; ethylene/butene/cyclopentadiene interpolymers; ethylene/butene/1,4-hexadiene interpolymers; and the like.

Exemplary of such polymers are ethylene-propylene copolymers, ethylene-butene-1 copolymers and the like. Preferred polymers are copolymers of ethylene and propylene and ethylene and butene-1.

The molar ethylene content of the polymers employed in this invention is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The diene monomers usable in the invention include the alpha/omega dienes, conjugated dienes, and some non-conjugated dienes. Included are 1,4-hexadiene dicyclopentadiene, 5-ethylidene-2-norbornene, vinyl norbornene, methyl hexadiene, and the like in portions up to about 25 weight percent of the polymer.

The polymers employed in this invention generally possess a number average molecular weight of from about 300 to about 20,000 (e.g., from 300 to 10,000), preferably from about 900 to 20,000; more preferably of from about 900 to 10,000 (e.g., from about 700 to about 15,000); from about 1500 to about 5,000. Polymers having a number average molecular weight within the range of from about 700 to 5,000 (e.g., 1500 to 3,000) are particularly useful in the present invention. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

Consequently, such polymers generally possess an intrinsic viscosity (as measured in tetralin at 135° C.) of between about 0.025 and about 0.9 dl/g, preferably of between about 0.05 and about 0.5 dl/g, most preferably of between about 0.075 and about 0.4 dl/g.

The polymers employed in this invention preferably exhibit a degree of crystallinity such that, when grafted, they are essentially amorphous.

The polymers employed in this invention are further characterized in that up to about 95% and more of the polymer chains possess terminal ethenylidene-type unsaturation. Thus, one end of such polymers will be of the formula POLY-C(T$^1$)=CH$_2$ wherein T$^1$ is C$_1$ to C$_{18}$ alkyl, preferably C$_1$ to C$_8$ alkyl, and more preferably C$_1$ to C$_2$ alkyl, (e.g., methyl or ethyl) and wherein POLY represents the polymer chain. The chain length of the T$^1$ alkyl group will vary depending on the comonomer(s) selected for use in the polymerization. A minor amount of the polymer chains can contain terminal ethenyl unsaturation, i.e. POLY-CH=CH$_2$, and a portion of the polymers can contain internal monounsaturation, e.g. POLY-CH=CH(T$^1$), wherein T$^1$ is as defined above.

The polymer employed in this invention comprises polymer chains, at least about 30 percent of which possess terminal ethenylidene unsaturation. Preferably at least about 50 percent, more preferably at least about 60 percent, and most preferably at least about 75 percent (e.g. 75–98%), of such polymer chains exhibit terminal ethyenylidene unsaturation. The percentage of polymer chains exhibiting terminal ethyenylidene unsaturation may be determined by FTIR spectroscopic analysis, titration, or C$^{13}$NMR.

The polymer and the composition employed in this invention may be prepared as described in U.S. Pat. No. 4,668, 834, in European Patent Publications 128,046 and 129,368, and in co-pending Ser. No. 728,111, filed Apr. 29, 1985, and copending Ser. No. 93,460, filed Sep. 10, 1987, the disclosures of all of which are hereby incorporated by reference in their entirety.

The polymers for use in the present invention can be prepared by polymerizing monomer mixtures comprising ethylene in combination with other monomers such as alpha-olefins and dienes having from 3 to 20 carbon atoms (and preferably from 34 carbon atoms, i.e., propylene, butene-1, and mixtures thereof) and cyclopentadiene, vinyl norbornene, etc. in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or polynuclear. One or more bulky ligands may be bonded to the transition metal atom. The transition metal atom may be a Group IV, V or VI transition metal. ("Group" refers to an identified group of the Periodic Table of Elements, comprehensively presented in "Advanced Inorganic Chemistry," F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula

wherein L is the bulky ligand, X is the leaving group, M is the transition metal and m and n are such that the total ligand valency corresponds to the transition metal valency. Preferably the catalyst is four coordinate such that the compound is ionizable to a $1^+$ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_mMR_nR'p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

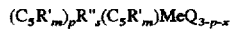

and

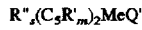

wherein Me is a Group IV, V, or VI transition metal $C_5R'_m$ is a substituted cyclopentadienyl each R', which can be the same or different is hydrogen, alkenyl aryl alkaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $C_5R'_m$ rings or bridging one $C_5R'_m$ ring back to Me, when p=0 and x=1 otherwise x is always equal to 0, each Q which can be the same or different is an aryl, alkyl, alkenyl, alkaryl, or arylalkyl radical having from 1 to 20 carbon atoms or halogen, Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the *polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A3 129 368 published Jul. 26, 1989, and U.S. Pat. Nos. 5,017,713 and 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to be any compound or component which can activate a bulky ligand transition metal compound. In one embodiment the activators generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri(n-butyl) ammonium tetra (pentafluorophenyl)boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A0520 732, EP-A-0 277 003, and EP-A0 277 004 published Aug. 3, 1988, and U.S. Pat. Nos. 5,153,157; 5,198,401 and 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057,475; 5,096,867; 5,055,438 and 5,227,440 and EP-A-0 420 436, WO 91/04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. All the catalyst systems of the invention may be, optionally, prepolymerized or used in conjunction with an additive or scavenging component to enhance catalytic productivity.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

However, the polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

PREPARATION OF ETHYLENE ALPHA-OLEFIN POLYMER SUBSTITUTED MONO- OR DICARBOXYLIC ACID MATERIAL

The ethylene alpha-olefin polymer substituted mono- or dicarboxylic acid material, i.e., acid, anhydride or acid ester of this invention, includes the reaction product of ethylene alpha-olefin polymer (including diene interpolymers) with a monounsaturated carboxylic reactant comprising at least one member selected from the group consisting of (i) monounsaturated $C_4$ to $C_{10}$ dicarboxylic acid wherein (a) the carboxyl groups are vicinyl, (i.e. located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is allylic to the carboxy group, i.e., of the structure

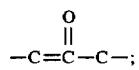

and (iv) derivatives of (iii) such as $C_1$ to $C_5$ alcohol derived mono- or di-esters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unreacted polymer. The unreacted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art.

Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms ethylene-alpha-olefin polymer substituted monocarboxylic acid material and ethylene-alpha-olefin polymer substituted dicarboxylic acid material are intended to refer to the product mixture whether it has undergone such modification or not.

Accordingly, the functionality of the ethylene-alpha-olefin polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g., 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g., 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

While chlorination normally helps increase the reactivity of polyolefins with monounsaturated carboxylic reactant, it is not necessary with the present polymers due to their high terminal bond content and reactivity. Also, the diene interpolymers may have additional unsaturation for functionalization. Preferably, therefore, the polymer and the monounsaturated carboxylic reactant are contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety. It has been surprisingly found that the terminally ethylenically-unsaturated ethylene alpha-olefin polymers used in this invention readily undergo such thermal "ene" reactions under conditions in which the formation of sediment, or other by-products contributing to product haze, is greatly minimized or avoided altogether. The improved low sediment ene reaction product mixture is preferably formed using a polymer (more preferably, ethylene-propylene copolymers) having a number average molecular weight of from about 300 to 20,000 (e.g., from 700 to 20,000), more preferably from about 900 to 15,000, still more preferably from about 1500 to 10,000 (e.g., from about 1500 to 5,000), and most preferably greater than about 1800 to about 5,000, and a polydispersity of less than about 4, preferably less than about 3, e.g., from 1.1 to 3.5, most preferably from 1.2 to 3.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of ene reaction products, particularly when employing maleic anhydride as the unsaturated acid reactant, with substantially no visibly observable sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant are contacted for a time and under conditions effective to form the desired ethylene alpha-olefin polymer substituted mono- or dicarboxylic acid material. Generally, the polymer and monounsaturated carboxylic reactant will be contacted in a polymer to unsaturated carboxylic reactant mole ratio usually from about 1:1 to 1:10, and preferably from about 1:1 to 1:5, at an elevated temperature, generally from about 120° to 260° C., preferably from about 160° to 240° C. The reaction will be generally carried out, with stirring for a time of from about 1 to 20 hours, preferably from about 2 to 6 hours. The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

The "ene" reaction product mixture thereby obtained has been surprisingly found to have a substantially reduced content of sediment or other solid by-products as impurities and can be employed, without filtering, centrifuging, clarification, phase separation or other conventional product purification treatments, as, e.g., an additive to lubricating oils or as intermediate in the preparation of derivative products for use in lubricating oils, as will be more completely described hereinafter.

The ene reaction product mixture is further improved by being substantially free of chlorine, that is, by having a chlorine content of less than about 25 ppm by weight, preferably less than about 10 ppm by weight.

The ene reaction product mixture comprising the desired ethylene-alpha-olefin substituted mono- or dicarboxylic acid material (e.g., ethylene-propylene polymer-substituted succinic anhydride) formed by the process of this invention will generally contain unreacted polymer, (that is, polymer which is unsubstituted by the mono- or dicarboxylic acid moiety), in a concentration of less than about 40 wt. % (e.g., from 5 to 35 wt. %), more preferably less than about 30 wt. % (e.g from 10 to 25 wt. %) and will be generally characterized by a VR value ("viscosity ratio" value) of not greater than about 4.1, usually not greater than about 4.0, preferably from about 2.0 to 3.9, and most preferably from about 3.0 to 3.8. As used herein, the term "VR value" is intended to mean quotient determined by the expression (IV):

$$VR = \frac{VISb}{VISa}$$

wherein VISa is the kinematic viscosity (KV) of the ene reaction product mixture at 100° C. in units of centistokes (as determined by ASTM Method No. D445) and VISb is the cold cranking simulator (CCS) viscosity of the ene reaction product mixture at −20° C. in units of poise (as determined by ASTM Method No. D2602), wherein the measurements are made upon a 2 wt % solution of the ene reaction product mixture in an oil (herein termed the "reference oil") comprising S150N (solvent 150 neutral) mineral lubricating oil (Exxon Company U.S.A.), wherein the such reference oil is characterized by an ASTM D445 kinematic viscosity of 5.2 cSt (100° C.) and an ASTM D2602 CCS viscosity of 19.2 poise (±0.4 poise) (at −20øC). The "VR," value of the reference oil will then be about 3.7±0.1.

Illustrative, therefore, of the improved ene reaction products of this invention are the following ethylene-propylene copolymer-substituted succinic acids and succinic anhydrides (EPSA), ethylene-butene-1 copolymer-substituted succinic acids and succinic anhydrides (EBSA) summarized in Table A below:

TABLE A

| Ene Product | Polymer (Mn) | Residual Halide (wppm) | Wt. % ai (1) | SA:Polymer Mole Ratio (2) | VR Value (3) |
|---|---|---|---|---|---|
| EPSA | 300–20,000 | ≦25 | ≧60 | ≧0.7:1 | ≦4.1 |
| EPSA | 300–10,000 | ≦10 | ≧60 | ≧1.0:1 | ≦4.0 |
| EPSA | 700–5,000 | ≦25 | ≧60 | ≧0.7:1 | ≦4.1 |
| EPSA | 700–5,000 | ≦10 | ≧60 | ≧1.0:1 | ≦4.0 |
| EPSA | 5,500–20,000 | ≦25 | ≧60 | ≧0.7:1 | ≦4.1 |
| EPSA | 5,500–10,000 | ≦10 | ≧70 | ≧0.7:1 | ≦4.0 |
| EPSA | 1,500–10,000 | ≦10 | 70–90 | ≧1.0:1 | ≦4.1 |
| EBSA | 300–20,000 | ≦25 | ≧60 | ≧0.7:1 | ≦4.1 |
| EBSA | 300–10,000 | ≦10 | ≧60 | ≧1.0:1 | ≦4.0 |
| EBSA | 700–5,000 | ≦25 | ≧60 | ≧0.7:1 | ≦4.1 |
| EBSA | 700–5,000 | ≦10 | ≧60 | ≧1.0:1 | ≦4.0 |
| EBSA | 5,500–20,000 | ≦25 | ≧60 | ≧0.7:1 | ≦4.1 |
| EBSA | 5,500–10,000 | ≦10 | ≧70 | ≧0.7:1 | ≦4.0 |
| EBSA | 1,500–10,000 | ≦25 | 70–90 | ≧1.0:1 | ≦4.0 |

NOTES:
(1) Wt. % active ingredient.
(2) SA = succinic anhydride; polymer = ethylene-propylene (EP) or ethylene butylene (EB) copolymer; moles of polymer in ratio based on the total of both the reacted and unreacted polymer; moles of "SA" based on the number of moles of succinic anhydride moieties per mole of ene reaction product.

It will be understood that the ethylene alpha-olefin polymers (including diene interpolymers) of this invention which are charged to the reaction zone can be charged alone or together with (e.g., in admixture with) other polyalkenes derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g. from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene the like as well as interpolymers of two or more of such olefins such as copolymers of: ethylene and propylene (prepared by conventional methods other than as described above for the preferred ethylene alpha-olefin copolymers employed in this invention, that is, ethylene-propylene copolymers which are substantially saturated, wherein less than about 10 wt % of the polymer chains contain ethylenic unsaturation); butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc. The additional such olefin polymers charged to the reaction will usually have number average molecular weights of at least about 900, more generally within the range of about 1200 and about 5,000, more usually between about 1500 and about 4,000. Particularly useful such additional olefin polymers have number average molecular weights within the range of about 1500 and about 3,000 with approximately one double bond per chain. An especially useful additional such polymer is polyisobutylene. Preferred are mixtures of such polyisobutylene with ethylene-propylene copolymers wherein at least 30 wt % of the copolymer chains contain terminal ethenylidene monounsaturation as described above.

The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

PREPARATION OF NUCLEOPHILICALLY-SUBSTITUTED DERIVATIVE PRODUCTS

The polymer substituted carboxylic acids/anhydrides/ esters of this invention, prepared as described above, can be contacted with a nucleophilic reactant, e.g., amines, alcohols, including polyols, amino-alcohols, reactive metal compounds, etc. to form the novel dispersants of this invention.

Amine compounds useful as nucleophilic reactants for reaction with the polymer substituted mono- or dicarboxylic acid materials include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g. hydroxy groups, alkoxy groups, amide groups, nitrites, imidazoline groups, and the like. Hydroxy amines with 1 to 6 hydroxy groups, preferably 1 to 3 hydroxy groups are particularly useful. Preferred amines are aliphatic saturated amines, including those of the general formula:

and

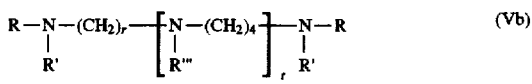

wherein R, R', R" and R'" are independently selected from the group consisting of hydrogen; $C_1$ to $C_{25}$ straight or branched chain alkyl radicals; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R'" can additionally comprise a moiety of the formula:

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R'", r, r', t and t' be selected in a manner sufficient to provide the compounds of Formulas Va and Vb with typically at least one primary or secondary amine group, preferably at least two primary or secondary amine groups. This can be achieved by selecting at least one of said R, R', R" or R'" groups to be hydrogen or by letting t in Formula Vb be at least one when R'" is H or when the Vi moiety possesses a secondary amino group. The most preferred amine of the above formulas are represented by Formula Vb and contain at least two primary amine groups and at least one, and preferably at least three, secondary amine groups.

Non-limiting examples of suitable amine compounds include: 1,2-diaminoethane; 1,3-diaminopropane; 1,4diaminobutane; 1,6-diaminohexane; polyethylene amines such as diethylene triamine; triethylene tetramine; tetraethylene pentamine; polypropylene amines such as 1,2-propylene diamine; d-(1,2-propylene)triamine; di-(1,3-propylene) triamine; N, N-dimethyl-1,3-di-aminopropane; N,N-di-(2-aminoethyl) ethylene diamine; N, N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-amino-propyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (VII):

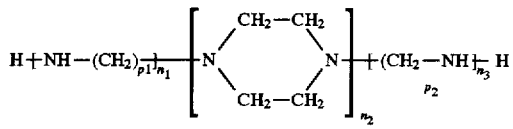

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alklene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula (VIII):

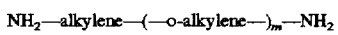

where m has a value of about 3 to 70 and preferably 10 to 35; and the formula (IX):

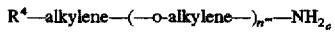

where n'" has a value of about 1 to 40 with the provision that the sum of all the n'" values is from about 3 to about 70 and preferably from about 6 to about 35, and $R^4$ is a polyvalent saturated hydrocarbon radical of up to ten carbon atoms wherein the number of substituents on the $R^4$ group is represented by the value of "a", which is a number of from 3 to 6. The alkylene groups in either formula (VII) or (IX) may be straight or branched chains containing about 2 to 7, and preferably about 2 to 4 carbon atoms.

The polyoxyalkylene polyamines of formulas (VII) or (IX) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D400, D-1000, D-2000, T403", etc.

A particularly useful class of amines are the polyamido and related amines disclosed in U.S. Pat. No. 4,857,217 (the disclosure of which is hereby incorporated by reference in its entirety), which comprise reaction products of a polyamine and an alpha, beta unsaturated compound of the formula:

wherein X is sulfur or oxygen, Y is —OR$^8$, —SR$^8$, or —NR$^8$(R$^9$), and R$^5$, R$^6$, R$^7$, R$^8$ and R$^9$ are the same or different and are hydrogen or substituted or unsubstituted hydrocarbyl. ANy polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula X, or with the thiocarbonyl group (—C(S)—) of the thioacrylate-type compound of formula X.

When R$^5$, R$^6$, R$^7$, R$^8$ or R$^9$ in Formula X are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of R$^5$ through R$^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of R$^5$ through R$^9$ are aryl, the aryl group will generally contain from 6 to 10 carbon atoms (e.g., phenyl, naphthyl).

When one or more of R$^5$ through R$^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of R$^5$ through R$^9$ are aralkyl, the aryl component generally consists of phenyl or (C$_1$ to C$_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of R$^5$ and R$^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of R$^5$ through R$^9$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

Wherein R$^5$, R$^6$ R$^7$, and R$^8$ are the same or different and are hydrogen or substituted or unsubstituted hydrocarbyl as defined above. Examples of such alpha, beta-ethylenically unsaturated carboxylate compounds of formula XI are acrylic acid, methacrylic acid, the methyl, ethyl, isopropyl, n-butyl and isobutyl esters of acrylic and methacrylic acids, 2-butenoic acid, 2-hexenoic acid, 2-decenoic acid, 3-methyl-2-heptenoic acid, 3-methyl-2-butenoic acid, 3-phenyl-2-propenoic acid, 3-cyclohexyl-2-butenoic acid, 2-methyl-2-butenoic acid, 2-ppropyl-2-propenoic acid, 2-isopropyl-2-hexenoic acid, 2,3-dimethyl-2butenoic acid, 3-cyclohexyl-2-methyl-2-pentenoic acid, 2-propenoic acid, methyl 2-propenoate, methyl 2-methyl 2-propenoate, methyl 2-butenoate,ethyl 2-hexnoate, isopropyl 2-decenoate, phenyl 2-pentenoate, tertiary butyl 2-propenoate, octadecyl 2-propenoate, dodecyl 2-decanoate, cyclopropyl 2,3-dimethyl-2-butenoate, methyl 3-phenyl-2-propenoate, and the like.

The alpha, beta ethylenically unsaturated carboxylate thioester compound employed herein have the following formula:

Wherein R$^5$, R$^6$, R$^7$, and R$^8$ are the same or different and are hydrogen or substituted or unsubstituted hydrocarbyl as defined above. Examples of such alpha, beta-ethylenically unsaturated carboxylate thioesters of formula XII are methylmercapto 2-butenoate, ethylmercapto 2-hexenoate, isopropylmercapto 2decanoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

Wherein R$^5$, R$^6$, R$^7$, R$^8$ and R$^9$ are the same or different and are hydrogen or substituted or unsubstituted hydrocarbyl as defined above. Examples of alpha, beta-ethylenically unsaturated carboxyamides of formula XIII are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3dimethyl-2-butenamide, 3cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2ethyl-2-propenamide and the like.

The alpha, beta ethylenically unsaturated thiocarboxylate compounds employed herein have the following formula:

Wherein R$^5$, R$^6$, R$^7$, R$^8$ and R$^9$ are the same or different and are hydrogen or substituted or unsubstituted hydrocarbyl as defined above. Examples of alpha, beta-ethylenically unsaturated thiocarboxylate compounds of formula XIV are 2-butenthioic acid, 2-hexenthioic acid, 2decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

Wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XV are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3dimethyl-2-butendithioic acid, 3cyclo-hexyl-2-methyl-2-pentendithioic acid, 2-propendithioic acid, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

Wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XVI are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propen-thioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propen-thioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate.

When the selected alpha, beta-unsaturated compound comprises a compound of formula X wherein X' is oxygen, the resulting reaction product with the polyamine contains at least one amido linkage (—C(O)N<) and such materials are herein termed "amido-amines." Similarly, when the selected alpha, beta unsaturated compound of formula X comprises a compound wherein X' is sulfur, the resulting raction product with the polyamine contains thioamide linkage (—C(S)N<) and these materials are herein termed "thioamido-amines." For lo convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula X tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed.

For more efficient cross-linking an excess of carboxylated material should preferably be used since a cleaner reaction ensures. For example, a molar excess of about 10–100% or greater such as 10–50%, but preferably an excess of 30–50%, of the carboxylated material. Larger excess can be employed, if desired.

In summary, without considering other factors, equimolar amounts of reactants tend to produce a more linear amido-amine whereas excess of the formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine has more labile hydrogens than ethylene diamine.

These amido-amine adducts so formed are characterized by both amido and amino groups. In their simplest embodiments they may be represented by units of the following idealized formula (XVIII):

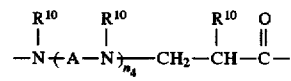

wherein the $R^{10}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula X are contacted in an amount of from about 1 to 10, more preferably from about 2 to 6, and most preferably from about 3 to 5, equivalents of primary amine in the polyamine reactant per mole of the unsaturated reactant of formula X.

The reaction between the selected polyamine and acrylate-type compound is carried out at any suitable temperature. Temperatures up to the decomposition points of reactants and products can be employed. In practice, one generally carried out the reaction by heating the reactants below 100° C., such as 80°–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the raction. Removal of alcohol is a cnvenient method of judging the progress and completion of the reaction which is generally continued until no more alcohol is evolved. Based on removal of alcohol, the yields are generally stoichiometric. In more difficult reactions, yields of at least 95% are generally obtained.

Similarly, it will be understood that the reaction of an ethylenically unsaturated carboxylate thioester of formula XII liberates the corresponding $HSR^8$ compound (e.g., $H_2S$ when $R^8$ is hydrogen) as a by-product, and the reaction of an ethylenically unsaturated carboxyamide of formula XIII liberates the corresponding $HNR^8$ ($R^9$) compound (e.g., ammonia when $R^8$ and R are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferable to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reactin of tetraethylene pentaamine (TEPA) with methyl methacrylate can be illustrated as follows:

$H_2N[CH_2CH_2NH]_3CH_2CH_2NH_2$ +

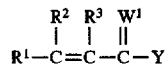

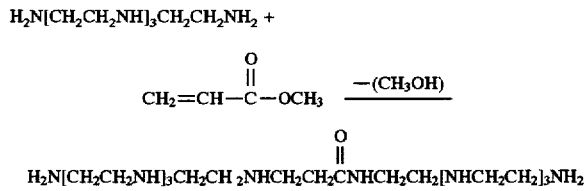

In a preferred embodiment, the nucleophilic reactant comprises a branched chain nitrogen containing adduct formed by a process which comprises: (a) contacting in a first liquid reaction mixture a first nitrogen-containing compound having at least two reactive nitrogen moieties with a polyfunctional reactant having within its structure a first functional group reactive with a —NH— group, and at least one additional functional group reactive with a —NH— group, in an amount and under conditions sufficient to selectively react the first functional groups in the polyfunctional ractant with the reactive nitrogen moieties to form a first reaction mixture containing a first adduct; and (b) contacting the first adduct with a second nitrogen-containing compound having at lest two —NH— groups in an amount and under conditions sufficient to react the additional functional groups in the first adduct with said —NH— groups in the second nitrogen-containing compound per nitrogen-containing moiety derived from the first nitrogen-containing compound and (ii) at least two unreacted primary or secondary amine groups per molecule.

Preferably, the branched chain nitrogen-containing adduct comprises a branched amido-amine adduct, and more preferably to a star branched amido-amine adduct, formed by (a) reacting a first nitrogen-containing compound (e.g., ammonia or an organic amine) with an alpha, beta-unsaturated compound of the formula:

$$\overset{R^2}{\underset{|}{R^1}}-\overset{R^3}{\underset{|}{C}}=\overset{W^1}{\underset{||}{C}}-\overset{}{C}-Y$$

wherein $W^1$ is sulfur or oxygen, Y is $—OR^4$, $—SR^4$, or $—NR^4(R^5)$, and $R^1$, $R^2$, $R^3$, $R^4$ and $R^5$ are the same or different and are hydrogen or substituted or unsubstituted hydrocarbyl, to form a first adduct containing unreacted $—C(W^1)—Y$ groups; and (b) reacting the first adduct with a polyamine (e.g., a polyalkylene polyamine) to form a second adduct containing unreacted —NH— groups (preferably primary amine groups) and comprising a branched amido-amine oligomer.

The first above adduct is prepared by contacting a polyfunctional reactant with a first nitrogen-containing compound containing at least two (e.g., from 2 to 20), preferably at least 3 (e.g., from 3 to 15), and most preferably from 3 to 8, reactive nitrogen moieties (that is, the total of the nitrogen-bonded H atoms) per molecule of the first nitrogen-containing compound. The first nitrogen-containing compound will generally comprise at least one member selected from the group consisting of ammonia, organic primary monoamines and organic polyamines containing at least one primary amine group or at least two secondary amine groups per molecule.

Most preferred as the first nitrogen-containing compound are members selected from the group consisting of ammonia and organic diprimary amines having from 2 to 12 carbon atoms and from 2 to 8 nitrogen atoms per molecule. Examples of such preferred organic diprimary amines are ethylene diamine, propylene diamine, diethylene triamine, dipropylene triamine, triethylene tetraamine, tripropylene tetraamine, tetraethylene pentaamine, tetrapropylene pentaamine, polyhexamethylene diamine, phenyl diamine.

The polyfunctional ractants useful in this invention include compounds having the formula (XX):

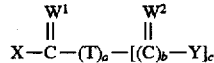

wherein $W^1$ and $W^2$ are the same or different and are O or S, X and Y are the same or different, and preferably are each groups reactive with a —NH— group (i.e., with $NH_3$ or with primary or secondary amine groups), T is a substituted or unsubstituted hydrocarbon moiety, "a" is 0 or 1, "b" is 0 or 1, and "c" is an integer of at least 1, with the provisos that c=1 when a=0 and b=1 when a=1, and with the further proviso that at least two of X, Y and T are reactive with a —NH— group.

The X and Y functional groups are the same or different and include groups selected from the group consisting of:

halide, —OR⁴, —SR⁴, —N(R⁴)(R⁵), —Z¹C(O)OR⁴, —C(O)R⁴, —(R³)C=C(R¹)(R²), —Z¹-nitrile, —Z¹-cyano, —Z¹-thiocyano, —Z¹-isothiocyano, and —Z¹-isocyano, wherein R¹, R², R³, R⁴ and R⁵ are the same or different and are H or substituted or unsubstituted hydrocarbyl and wherein Z¹ is $C_1$ to $C_{20}$ (preferably $C^1$ to $C^{10}$) bivalent hydrocarbylene (preferably alkylene or arylene). If a=b=1, and T contains at least one >C=C< group, X and Y can together further comprise —O— or —S—, to provide as reactants a class of ethylenically unsaturated and aromatic anhydrides and sulfo-anhydrides. Preferably, the X and Y groups in the selected polyfunctional reactant are different, and the reactivity of the X moiety with —NH— groups, under the selected reaction conditions, is greater than the reactivity of the Y moieties with such —NH— groups to permit a substantially selective reaction of the X groups with the first nitrogen-containing compound as described below. The relative reactivity of these groups on a polyfunctional reactant can be readily determined by conventional methods.

When R¹, R², R³, R⁴, or R⁵ are hydrocarbyl, these groups can comprise alkyl, cycloalkyl, aryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of R¹ through R⁵ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl,hexadecyl, octadecyl and the like. When one or more of R¹ through R⁵ are aryl, the aryl group will generally contain from 6 to 10 carbon atoms (e.g., phenyl, nephthyl).

When one or more of R¹ through R⁵ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of R¹ through R⁵ are aralkyl, the aryl component generally consists of phenyl or ($C_1$ to $C_6$) alkyl-substituted phenol and the alkylcomponent generally contains from 1 to 12 carbon atoms, and preferably from 1 to 6 carbon atoms. Examples of such aralkyl groups are benzyl, o-ethylbenzyl, and 4-isobutylbenzyl. When one or more of R¹ through R⁵ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of R¹ through R⁵ are heterocyclic, the heterocyclic group generally consists fo a compound having at lest one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

T is a polyvalent organic radical whose valence is equal to c+1, wherein "c" is an integer of at least 1, preferably 1 to 3. Ordinarily T will not contain more than 20 carbon atoms and preferably not more than 10 carbon atoms. T can therefore include divalent groups such as saturated and unsaturated hydrocarbylene (e.g., alkylene, alkenylene, arylene, and the like). When T is substituted, it can contain one or more substituents selected from the class consisting of halo, lower alkoxy, lower alkyl mercapto, nitro, lower alkyl, carboxy and oxo. It also may contain interrupting groups such as —O—, —S—, —S(O)—, —S(O)₂—, —NH—, —C(O)— and the like.

Exemplary of Z¹ groups are $C^1$ to $C^{10}$ branched and straight chained alkylene such as —(CH₂)f— wherein "f" is an integer of from 1 to 10 (e.g., —CH₂—, —C₂H₄—, —C₃H₇—, —C₄H₈—, —C₅H₁₀—, and the like), and C₆ to C₂₀ arylene, and alkyl-substituted arylene such as —Ar—, —Ar—((CH₂)f)—, —((CH₂)f)—Ar—, —Ar—((CH₂)f—Ar— and the like, wherein Ar is phenylene, methylphenylene, naphthylene, methylnaphthylene and the like and wherein f is as defined above.

Examples of polyfunctional reactants of formula XX wherein X is (R¹)(R²)C=C(R³)—, a=b=0 and c=1 are difunctional reactants comprising alpha, beta-ethylenically unsaturated compounds selected from the group consisting of compounds of the formula:

(XXI)

wherein W¹ is sulfur or oxygen, Y is as defined above, and is preferably —OR⁴, —SR⁴, or —NR⁴(R⁵), wherein R¹, R², R³, R⁴ and R⁵ are as defined above.

Preparation of the Dispersant

The amine is readily reacted with the selected material, e.g., the ethylene-propylene copolymer substituted succinic anhydride, by reacting an oil solution containing 5 to 95 wt. % of the polymer substituted mono- or dicarboxylic acid material at about 100° to 250° C., preferably 125° to 175° C., generally for 1 to 10, e.g., 2 to 6 hours until the desired amount of water is removed. The heating is preferably carried out to favor formation of imides or mixtures of imides and amides, rather than amides and salts.

Reaction ratios of polymer substituted mono- and dicarboxylic acid material to equivalents of amine as well as the other nucleophilic reactants described herein can vary considerably, depending on the reactants and type of bonds formed. When the polymer comprises a polymer lo substituted dicarboxylic acid material, containing dicarboxylic acid producing moieties derived from any of the above monounsaturated dicarboxylic acids, or anhydride or ester derivatives thereof, generally from 0.05 to 1.0, preferably from about 0.1 to 0.6, e.g., 0.2 to 0.4, moles of dicarboxylic acid moiety content (e.g., grafted maleic anhydride content) is used, per equivalent of nucleophilic reactant, e.g., amine. For example, about 0.8 mole of a pentamine (having two primary amino groups and 5 equivalents of nitrogen per molecule) is preferably used to convert into a mixture of amides and imides, the product formed by reacting one mole of polymer with sufficient maleic anhydride to add 1.6 moles of succinic anhydride groups per mole of polymer, i.e., preferably the pentamine is used in an amount sufficient to provide about 0.4 mole (that is 1.6/[0.8×5] mole) of succinic anhydride moiety per nitrogen equivalent of the amine. If an amido-amine, as above, is employed, generally from 1 to 5, preferably from about 1.5 to 3 moles of dicarboxylic acid moiety content (e.g., grafted maleic anhydride content) is used per equivalent of amido-amine reactant, e.g., amine.

When the polymer comprises a polymer substituted monocarboxylic acid material, containing monocarboxylic acid producing moieties derived from any of the above monounsaturated monocarboxylic acids, or ester derivatives thereof, generally from 0.05 to 1.0, preferably from about 0.1 to 0.6, e.g., 0.2 to 0.4, moles of monocarboxylic acid moiety content (e.g., grafted acrylic acid content) is used, per equivalent of nucleophilic reactant, e.g., amine. If an amido-amine, as above, is employed, generally from 1 to 5, preferably from about 1.5 to 3 moles of monocarboxylic acid moiety content (e.g., grafted acrylic acid content) is used per equivalent of amido-amine reactant, e.g., amine.

An example of the reaction of an amido-amine reactant with a polymer mono- or dicarboxylic acid producing reactant is the reaction of ethylene-propylene copolymer substituted succinic anhydride (EPSA) with a polyamido-amine having two terminal —$NH_2$ groups, which can be illustrated as follows:

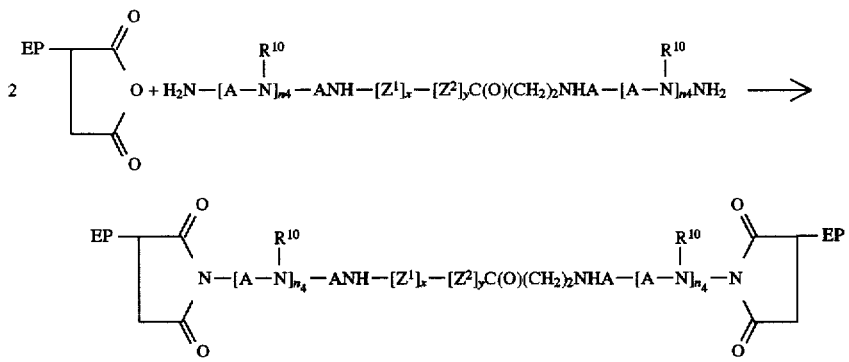

where x and y are each integers of from 0 to 10, EP represents an ethylene-propylene copolymer group as described above, $Z^1$ and $Z^2$ are moieties of the formula:

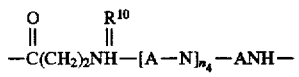

wherein $R^{10}$, A and $n_4$ are as defined above for Formula XVIII. Preferred are amido-amine reactin products of the above equation wherein $R^{10}$ is H, and most preferably wherein x and y are each zero, and A is —$(CH_2)_2$— or —$(CH_3H_7)$—.

It will be understood that the amine reactant can comprise one or a mixture of any of the above described amines, such as a mixture of an amido-amine and a polyalkylene polyamine, substituted mono- or dicarboxylic acid producing material and amine will be contacted for a time and under conditions sufficient to react substantially all of the primary nitrogens in the amine reactant. The progress of this reaction can be followed by infrared analysis.

The dispersant-forming reaction can be conducted in a polar or non-polar solvent (e.g., xylene, toluene, benzene and the like), and is preferably conducted in the presence of a mineral or synthetic lubricating oil.

Tris(hydroxymethyl) amino methane (THAM) can be reacted with the aforesaid polymer substituted acid material to form amides, imides or ester type additives as taught by U.K. 984,409, or to form oxazoline compounds and borated oxazoline compounds as described, for example, in U.S. Pat. Nos. 4,102,798; 4,116,876 and 4,113,639.

The ashless dispersants may also be esters derived from the aforesaid ethylene alpha-olefin polymer substituted mono- or dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022. The ester dispersant may also be borated, similar to the nitrogen containing dispersants, as described above.

Hydroxyamines which can be reacted with the aforesaid ethylene alpha-olefin polymer substituted dicarboxylic acid material to form dispersants include 2-amino-1butanol, 2-amino-2-methyl-1-propanol, p-(beta-hydroxyethyl)-aniline, 2-amino-1-propanol, 3-amino-1-propanol, 2-amino-2-methyl -1,3-propane-diol, 2-amino-2-ethyl-1,3-propanediol, N-(beta-hydroxypropyl)-N'-(beta-amino-ethyl) -piperazine, tris(hydroxymethyl) amino-methane (also known as trismethylolaminomethane), 2-amino-1-butanol, ethanolamine, beta-(beta-hydroxyethoxy)-ethylamine, and the like. Mixtures of these or similar amines can also be employed. The above description of nucleophilic reactants suitable for reaction with the ethylene alpha-olefin polymer substituted dicarboxylic acid or anhydride includes amines, alcohols, and compounds of mixed amine and hydroxy containing reactive functional groups, i.e., amino-alcohols.

Reactive metals or reactive metal compounds useful for reaction with the ethylene-alpha-olefin polymer substituted mono- and dicarboxylic acid materials of this invention are those which will form carboxylic acid metal salts with the ethylene-alpha-olefin polymer substituted mono- and dicarboxylic acid materials of this invention and those which will form metal-containing complexes with such dispersant derivative compositions produced by reacting the ethylene-alpha-olefin polymer substituted mono- and dicarboxylic acid materials with amines and/or alcohols as discussed above. Reactive metal compounds useful for the formation of such complexes are disclosed in U.S. Pat. No. 3,306,908. Complex-forming metal reactants include the nitrates, nitrites, halides, carboxylates, phosphates, phosphites, sulfates, sulfites, carbonates, borates, and oxides of cadmium as well as metals having atomic numbers from 24 to 30 (including chromium, manganese, iron, cobalt, nickel, copper and zinc). These metals are the so-called transition or co-ordination metals, i.e., they are capable of forming complexes by means of their secondary or co-ordination valence. Specific examples of the complex-forming metal compounds useful as the reactant in this invention are cobaltous nitrate, cobaltous oxide, cobaltic oxide, cobalt nitrite, cobaltic phosphate, cobaltous chloride, cobaltic chloride, cobaltous carbonate, chromous acetate, chromic acetate, chromic bromide, chromous chloride, chromic fluoride, chromous oxide, chromium dioxide, chromic oxide, chromic sulfite, chromous sulfate heptahydrate, chromic sulfate, chromic formate, chromic hexanoate, chromium oxychloride, chromic phosphite, manganous acetate, manganous benzoate, manganous carbonate, manganese dichloride, manganese trichloride, manganous citrate, manganous formate, manganous nitrate, manganous oxalate, manganese monooxide, manganese dioxide, manganese trioxide, manganese heptoxide, manganic phosphate, manganous pyrophosphosate, manganic metaphosphate, manganous hypophosphite, manganous valerate, ferrous acetate, ferric benzoate, ferrous bromide, ferrous carbonate, ferric formate, ferrous lactate, ferrous nitrate, ferrous oxide, ferric oxide, ferric hypophosphite, ferric sulfate, ferrous sulfite, ferric hydrosulfite, nickel dibromide, nickel dichloride, nickel nitrate, nickel dioleate, nickel stearate, nickel sulfite, cupric propionate, cupric acetate, cupric metaborate, cupric benzoate, cupric formate, cupric laurate, cupric nitrite, cupric oxychloride, cupric palmitate, cupric salicylate, zinc benzoate, zinc borate, zinc bromide, zinc chromate, zinc dichromate, zinc iodide, zinc lactate, zinc nitrate, zinc oxide, zinc stearate, zinc sulfite, cadmium benzoate, cadmimum carbonate, cadmium butyrate, cadmium chloroactate, cadmium, fumerate, cadmium nitrate, cadmium di-hydrogenphosphate, cadmium sulfite, and cadmium oxide. Hydrates of the above compounds are especially convenient for use in the process of this invention.

U.S. Pat. No. 3,306,908 is expressly incorporated herein by reference for its discussion of reactive metal compounds suitable for forming such complexes and its disclosure of processes for preparing the complexes.

Basically, those processes are applicable to the dispersant derivative compositions of the ethylene-alpha-olefin polymer substituted mono- and dicarboxylic acid materials of this invention with the amines as described above by substituting, or on an equivalent basis, the ethylene-alpha-olefin polymer substituted mono- and dicarboxylic acid materials of this invention with the high molecular weight carboxylic acid acylating agents disclosed in U.S. Pat. No. 3,306,908. The ratio of equivalents of the acylated amine thus produced and the complex-forming metal reactant remains the same as disclosed in U.S. Pat. No. 3,306,908.

U.S. Pat. No. Reissue 26,433 discloses metals useful in preparing salts from the dispersant derivative compositions of the ethylene-alpha-olefin polymer substituted mono- and dicarboxylic acid materials of this invention and amines as described hereinabove. Metal salts are prepared, according to this patent, from alkali metals, alkaline earth metals, zinc, cadmium, lead, cobalt and nickel. Examples of a reactive metal compound suitable for use herein are sodium oxide, sodium hydroxide, sodium carbonate, sodium methylate, sodium propylate, sodium pentylate, sodium phenoxide, potassium oxide, potasium hydroxide, potassium carbonate, potassium methylate, potassium pentylate, potassium phenoxide, lithium oxide, lithium hydroxide, lithium carbonate, lithium pentylate, calcium oxide, calcium hydroxide, calcium carbonate, calcium methylate, calcium ethylate, calcium propylate, calcium chloride, calcium fluoride, calcium pentylate, calcium phenoxide, calcium nitrate, barium oxide, barium hydroxide, barium carbonate, barium chloride, barium fluoride, barium methylate, barium propylate, barium pentylate, barium nitrate, magnesium oxide, magnesium hydroxide, magnesium carbonate, magnesium ethylate, magnesium propylate, magnesium chloride, magnesium bromide, barium, iodide, magnesium phenoxide, zinc oxide, zinc hydroxide, zinc carbonate, zinc methylate, zinc propylate, zinc pentylate, zinc chloride, zinc fluoride, zinc nitrate trihydrate, cadmium oxide, cadmium hydroxide, cadmium carbonate, cadmium methylate, cadmium propylate, cadmium chloride, cadmium bromide, cadmium fluoride, lead oxide, lead hydroxide, lead carbonate, lead ethylate, lead pentylate, lead chloride, lead fluoride lead iodide, lead nitrate, nickel oxide, nickel hydroxide, nickel carbonate, nickel chloride, nickel bromide, nickel fluoride, nickel methylate, nickel pentylate, nickel nitrate hexahydrate, cobalt oxide, cobalt hydroxide, cobaltous bromide, cobaltous chloride, cobalt butylate, cobaltous nitrate hexahydrate, etc. The above metal compounds are merely illustrative of those useful in this invention and the invention is not to be considered as limited to such.

U.S. Pat. No. Reissue 26,433 is expressly incorporated herein by reference for its disclosure of reactive metal compounds useful herein and processes for utilizing these compounds in the formation of salts. Again, in applying the teachings of this patent to the present invention, it is only necessary to substitute the ethylene-alpha-olefin polymer substituted mono- and dicarboxylic acid materials of this invention on an equivalent weight basis for the high molecular weight carboxylic acylating agents of the reissue patent.

U.S. Pat. No. 3,271,310 discloses the preparation of metal salt of high molecular weight carboxylic acid acylating agents, in particular alkenyl succinic acids. The metal salts disclosed therein are acid salts, neutral salts, and basic salts. Among the illustrative reactive metal compounds used to prepare the acidic, neutral and basic salts of the high molecular weight carboxylic acids disclosed in U.S. Pat. No. 3,271,310 are lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. The present invention is not to be considered as limited to the use of the above metal compounds; they are presented merely to illustrate the metal compounds included within the invention.

U.S. Pat. No. 3,271,310 is expressly incorporated herein by reference for its disclosure of suitable reactive metal compounds for forming salts of the ethylene-alpha-olefin polymer substituted mono- and dicarboxylic acid materials of this invention as well as illustrative processes for preparing salts of these materials. As will be apparent, the processes of U.S. Pat. No. 3,271,310 are applicable to the polymer substituted materials of this invention merely by substituting on an equivalent weight basis, the ethylene-alpha-olefin polymer substituted mono- and dicarboxylic acid materials of this invention for the high molecular weight carboxylic acids of the patent.

From the foregoing description, it is apparent that the ethylene-alpha-olefin polymer substituted mono- and dicarboxylic acid materials of this invention can be reacted with any individual amine, alcohol, reactive metal, reactive metal compound or any combination of two or more of any of these; that is, for example, one or more amines, one or more alcohols, one or more reactive metals or reactive metal compounds, or a mixture of any of these.

The mixture can be a mixture of two or more amines, a mixture of two or more alcohols, a mixture of two or more metals or reactive metal compounds, or a mixture of two or more components selected from amines and alcohols, from amines and reactive metals or reactive metal compounds, from alcohols and reactive metals compounds, or one or more components from each of the amines, alcohols, and reactive metal or reactive metal compounds. Furthermore, the ethylene-alpha-olefin polymer substituted mono- and dicarboxylic acid materials of this invention can be reacted with the amines, alcohols, reactive metals, reactive metal compounds, or mixtures thereof, as described above, simultaneously (concurrently) or sequentially in any order of reaction.

Canadian Patent 956,397 is expressly incorporated herein by reference for its disclosure of procedures for reacting the ethylene-alpha-olefin polymer substituted mono- and dicarboxylic acid materials of this invention with amines, alcohols, reactive metal and reactive metal compounds, or mixtures of these, sequentially and simultaneously. All that is required to apply the processes of that patent to this invention is to substitute, on an equivalent weight basis, the ethylene-alpha-olefin polymer substituted mono- and dicarboxylic acid materials of this invention for the high molecular weight carboxylic acid acylating agents disclosed in that Canadian patent.

Carboxylic acid derivatives of this invention prepared utilizing the processes disclosed in the Canadian patent constitute a preferred class of carboxylic acids or carboxylic acid derivative compositions. The following Patents are also incorporated herein by reference, being counterparts of the incorporated Canadian patent, for the same reasons given for incorporating the Canadian patent: 3,836,469; 3,836,470; 3,836,471; 3,838,050; 3,838,052; 3,879,308; 3,957,854; 3,957,855. The Canadian patent and the U.S. patents are also incorporated herein to illustrate that the amount of polyoxyalkylene alcohol demulsifier utilized in preparing dispersant/ detergents from the ethylene-alpha-olefin polymer substituted mono- and dicarboxylic acid materials of this invention is normally quite small on an equivalent basis.

It is also pointed out that, among the more preferred carboxylic derivative compositions of this invention are those prepared according to the Canadian patent and corresponding U.S. patent and application identified above in which the polyoxyalkylene alcohol demulsifier has been omitted. In other words, a preferred class of carboxylic derivative compositions of this invention are the various reaction products of the high molecular weight carboxylic acid acylating agents of the Canadian patent with one or more amines, alcohols, and reactive metal compounds as disclosed therein differing only in that the ethylene-alpha-olefin polymer substituted mono- and dicarboxylic acid materials of this invention are substituted on an equivalent weight basis and, further, that the polyoxyalkylene alcohol demulsifier reactant is omitted.

In addition, U.S. Pat. No. 3,806,456 is expressly incorporated herein by reference for its disclosure of processes useful in preparing products from the ethylene-alpha-olefin polymer substituted mono- and dicarboxylic acid materials of this invention and polyoxyalkylene polyamines as described hereinbefore. Substitution of the ethylene-alpha-olefin polymer substituted mono- and dicarboxylic acid materials of this invention for the high molecular weight carboxylic acid acylating agents disclosed in U.S. Pat. No. 3,806,456 on an equivalent weight basis produces compounds of similar utility further characterized by the desired viscosity index improving properties discussed hereinbefore.

U.S. Pat. No. 3,576,743 is also incorporated herein by reference for its disclosure of a process for preparing carboxylic derivative compositions from both polyhydric alcohols and amine; in particular, hydroxy-substituted primary amines. Again, substitution of the ethylene-alpha-olefin polymer substituted mono- and dicarboxylic acid materials of this invention on an equivalent weight basis for the high molecular carboxylic acid acylating agents disclosed in U.S. Pat. No. 3,576,743 provides compositions having the desired dispersant/detergent compositions and the V.I. improving properties already discussed.

U.S. Pat. No. 3,632,510 is expressly incorporated herein by reference for its disclosure of processes for preparing mixed ester-metal salts. Mixed ester-metal salts derived from ethylene-alpha-olefin polymer substituted mono- and dicarboxylic acid materials of this invention, the alcohols, and the reactive metal compounds can be prepared by following the processes disclosed in U.S. Pat. No. 3,632,510 but substituting, on an equivalent weight basis, the ethylene-alpha-olefin polymer substituted mono- and dicarboxylic acid materials of this invention for the high molecular weight carboxylic acid acylating agents of the patent. The carboxylic acid derivative compositions thus produced also represent a preferred aspect of this invention.

Finally, U.S. Pat. Nos. 3,755,169; 3,804,763; 3,868,330; and 3,948,800 are expressly incorporated herein by reference for their disclosure of how to prepare carboxylic acid derivative compositions. By following the teachings of these patents and substituting the ethylene-alpha-olefin polymer substituted mono- and dicarboxylic acid materials of this invention for the high molecular weight carboxylic acylating agents of the patents, a wide range of carboxylic derivative compositions within the scope of the present invention can be prepared.

Incorporation of so many patents is done for the sake of brevity and because, it is felt, that the procedures necessary to prepare the carboxylic derivative compositions from the ethylene alpha-olefin polymer substituted mono- and dicarboxylic acid materials and the amines, alcohols, and reactive metals and reactive metal compounds, as well as mixtures thereof, is well within the skill of the art, such that a detailed description herein is not necessary.

A preferred group of ashless dispersants are those derived from ethylene-propylene copolymer (and diene interpolymer) substituted with succinic anhydride groups (referred to herein as "EPSA") and reacted with polyethylene amines, e.g., tetraethylene pentamine, pentaethylene hexamine, polyoxyethylene and polyoxypropylene amines, e.g., polyoxypropylene diamine, trismethylolaminomethane and pentaerythritol, and combinations thereof. One particularly preferred dispersant combination involves a combination of (A) ethylene-propylene copolymer substituted with succinic anhydride groups and reacted with (B) a hydroxy compound, e.g., pentaerythritol, (C) a polyoxyalkylene polyamine, e.g., polyoxypropylene diamine, and (D) a polyalkylene polyamine, e.g. polyethylene diamine and tetraethylene pentamine using about 0.3 to about 2 moles each of (B) and (D) and about 0.3 to about 2 moles of (C) per mole of (A) as described in U.S. Pat. No. 3,804,763. Another preferred dispersant combination involves the combination of (A) ethylene-propylene copolymer succinic anhydride with (B) a polyalkylene polyamine, e.g., tetraethylene pentamine, and (C) a polyhydric alcohol or polyhydroxy-substituted aliphatic primary amine, e.g., pentaerythritol or trismethylolaminomethane as described in U.S. Pat. No. 3,632,511.

The dispersant materials of this invention are preferably characterized by a VR' value of not greater than about 4.1, preferably not greater than about 4.0, e.g., from about 2.5 to 4.0, and most preferably from about 3.5 to 3.9. As used herein, the term "VR' value" is intended to refer to the quotient obtained by the expression (XIX):

$$VR' = \frac{VISb}{\leftarrow VISa}$$

wherein VIS'a is the kinematic viscosity (ASTM Method D445) of the dispersant material at 100° C. in units of centistokes, and VIS'b is the cold cranking simulator (CCS) viscosity (ASTM Method D2602) at -20° C. in units of poise, as determined at a dispersant material polymer concentration of 2 wt. % in the reference oil as defined above for Formula IV. Preferably, the disperant materials of this invention are also characterized by a VR'/VR$_r$ ratio of not greater than about 1.11, more preferably not greater than about 1.09, still more preferably from about 0.7 to 1.08 and most preferably from about 0.9 to 1.05, wherein VR$_r$= 3.7±0.1 for the reference oil.

Another aspect of this invention involves the post treatment of the nitrogen or ester containing dispersant materials. The process for post-treating said nitrogen or ester containing dispersant materials is analogous to the post-treating processes used with respect to derivatives of conventional ethylene copolymers of the prior art. Accordingly, the same reaction conditions, ratio of reactants and the like can be used.

The nitrogen-containing dispersant materials of the instant invention as described above are post-treated by contacting said nitrogen-containing dispersant materials with one or more post-treating reagents selected from the group consisting of boron oxide, boron oxide hydrate, boron halides, boron acids, esters of boron acids, carbon disulfide, sulfur, sulfur clorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, $C_1$ to $C_{30}$ hydrocarbyl substituted succinic acids and anhydrides (e.g., succinic anhydride, dodecyl succinic anhydride and the like), maleic anhydride (or any of the above discussed monounsaturated carboxylic reactants useful in forming the ethylene-alpha-olefin polymer-substituted mono- and dicarboxylic acid materials employed in this invention), phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols. The same post-treating reagents are used with the dispersant materials prepared from a combination of polyamines and polyols. However, when the dispersant materials are derived from polyols, and that is, when they are esters, the post-treating reagents are usually selected from the group consisting of boron oxide, boron oxide hydrate, boron halides, boron acids, esters of boron acids, sulfur, sulfur chlorides, phosphorus sulfides, phosphorus oxides, epoxides, and episulfides.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated dispersants of the invention contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the dispersant as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190°, e.g. 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

Since post-treating processes involving the use of these post-treating reagents is known insofar as application to reaction products of high molecular weight carboxylic acid acylating agents of the prior art and amines and/or alcohols, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,184,411; 3,185,645; 3,185,704, 3,200,107; 3,245,908; 3,245,909; 3,245,910, 3,254,025; 3,256,185; 3,278,550; 3,280,034; 3,281,428; 3,282,955; 3,284,410; 3,312,619; 3,338,832, 3,344,069; 3,366,569; 3,367,943; 3,369,021; 3,373,111; 3,390,086; 3,403,102; 3,415,750; 3,428,561; 3,458,530; 3,470,098; 3,502,677; 3,513,093; 3,533,945; 3,541,012; 3,551,466; 3,558,743; 3,573,205; 3,639,242; 3,652,616; 3,692,681; 3,708,522; 3,718,663; 3,749,695; 3,859,318; 3,865,740; 3,865,813; 3,954,639; 4,338,205; 4,428,849; 4,686,054; 4,839,070; 4,839,071; 4,839,072; 4,839,073; U.K. Pat. No. 1,085,903; U.K. Pat. No. 1,162,436.

The nitrogen and/or ester containing dispersant materials of this invention can also be treated with polymerizable lactones (such as epsilon-caprolactone) to form dispersant adducts having the moiety —[C(O)(CH$_2$)$_z$O]$_m$H, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C, and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials if this invention and epsilon-caprolactone are those adducts illustrated by the following equation:

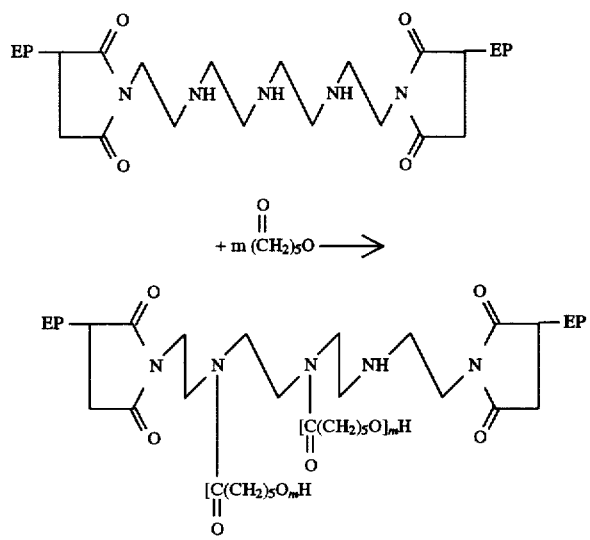

wherein m and EP are as defined above. The reactions of such lactones with dispersant materials containing nitrogen or ester groups is more completely described in U.S. Pat. Nos. 4,486,326; 4,820,432; 4,828,742; 4,851,524; 4,866,135; 4,366,139; 4,866,140; 4,866,141; 4,866,142, and 4,866,187, the disclosure of each of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thiophosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

As a further feature of the present invention, the (A) ethylene-alpha-olefin polymer (including diene terpolymer) substituted mono- and di-carboxylic acid materials of this invention can be admixed, prior to, after or during being contacted with the selected nucleophilic reagant, with (B) a conventional polyolefin-substituted mono- or dicarboxylic acid material derived from any of the polyolefins discussed above as being useful as a mixed charge with the ethylenically unsaturated ethylene-alpha-olefin polymers in the formation of the ethylene-alpha-olefin polymer substituted mono-and di-carboxylic acid materials of this invention. The ethylene-alpha-olefin polymer substituted mono- and di-carboxylic acid materials of this invention and the polyolefin-substituted mono- or dicarboxylic acid material will be generally admixed prior to contact with the selected selected nucleophilic reagant, e.g., alkylene polyamine. Such mixtures will generally employ a weight:weight ratio of ethlyene-alpha-olefin polymer substituted mono-and di-carboxylic acid materials of this invention to polyolefin-substituted mono- or dicarboxylic acid material from about 10:90 to 90:10, preferably from about 20:80 to 80:20, and more preferably from about 40:60 to 60:40. Especially preferred are mixtures of ethylene-propylene copolymer-substituted succinic anhydride materials of this invention and polybutyl-substituted succinic anhydride (derived from polyisobutylene, poly-n-butene, or mixtures thereof, having a number average molecular weight as described above for the above conventional polyolefins, e.g., 900–5,000, more usually from about 1300 to 3,000). The resulting mixtures can then be contacted for reaction with the selected nucleophilic reagent as described above for formation of dispersant materials having improved viscosity properties, wherein the VR' of the resulting dispersant material is preferably less than the VR' of the corresponding dispersant prepared from the polyolefin-substituted mono- or dicarboxylic acid material alone. The resulting mixed dispersant materials can also be treated with any of the above-described post-treatment methods for incorporation of additional functional groups thereon, such as boron, hydroxy, ester, epoxy, lactone, sulfur, metals and the like, as discussed above.

OLEAGINOUS COMPOSITIONS

The dispersants of the present invention can be incorporated into a lubricating oil (or a fuel) in any convenient way. Thus, these dispersants can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the dispersants can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

When the products of this invention are incorporated into crude oil refinery process streams and other hydrocarbon fluid process streams, they function as antifoulants and will be generally used, e.g., in amounts of up to 100 ppm, e.g., 5 to 50 ppm, in the same manner as the macrocyclic polyamine additive as described in U.S. Pat. No. 4,569,750, the disclosure of which is hereby incorporated by reference, in its entirety.

The dispersant products of the present invention possess very good dispersant properties as measured herein in a wide variety of environments. Accordingly, the dispersant products are used by incorporation and dissolution into oleaginous materials such as fuels and lubricating oils. When the dispersant products of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl4-methylphenol, rust inhibitors, bacteriostatic agents, gum inhibitors, metal deactivators, upper cylinder lubricants and the like.

The dispersant products of the present invention find their primary utility in lubricating oil compositions which employ a base oil in which the additives re dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, and other ashless dispersant (e.g., polyisobutenyl succinimides) and borated derivatives thereof, etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)disiloxane, poly(methyl)-siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids.

Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$–$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$\text{HOOC—ArR}_1\text{—Xy(ArR}_1\text{OH)n} \qquad (XX)$$

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (XXI):

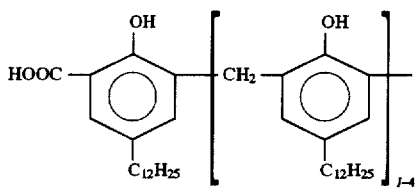

with a TBN of 60 to 150 is highly useful in this invention.

The sulfurized metal phenates can be considered the "metal salt of a phenol sulfide" which thus refers to a metal salt whether neutral or basic, of a compound typified by the general formula (XXII):

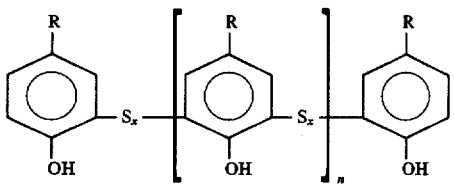

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$). The overbased sulfurized metal phenates desirably have a TBN value of at least 150, e.g. from 200 to 300.

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

A particular advantage of the novel dispersants of the present invention is use with V.I improvers to form multigrade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g., with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$–$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylamino-ethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

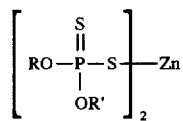

(XXIII)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R' in formula XXIII) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials above discussed ashless dispersants which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $\overline{M}_n$ from about 900 to 1400, and up to 2500, with a $\overline{M}_n$ of about 950 being most preferred. Especially preferred is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the lubricating oil will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid trio derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl-or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

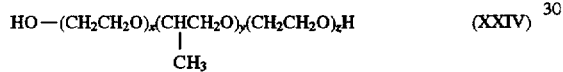

(XXIV)

wherein x,y, and z are integers greater than 1 such that the —H$_2$CH$_2$O— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

(XXV)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to (CH$_2$CH$_2$O) units are particularly good. Also useful are alkoxylated fatty amines, amides, alcohols and the like, including such alkoxylated fatty acid derivatives treated with C$_9$ to C$_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis(t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | 0.01–4 | 0.01–12 |
| Detergents | 0.01.–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. In the Examples, SA:PIB and SA:EP-polymer ratios are based upon the total PIB and EP-polymer, respectively, charged to the reactor as starting material, i.e., both the PIB and EP-polymer which reacts and the PIB and EP-polymer which remains unreacted. In the Examples, wt. % ethylene in the polymers was determined by FTIR (ASTM Method D3900). In the Examples, the "reference oil" was as defined above for Formula IV.

EXAMPLE 1

Preparation of Ethylene-Propylene Copolymer

A 1 liter Zipperclave reactor (Autoclave Engineers) equipped with a water jacket for temperature control, with a septum inlet for syringe injection of catalyst, and with a supply of purified nitrogen, liquid propylene, and ethylene was used used in these polymerizations. The reactor was cleaned with hot toluene and then was purged well with dry nitrogen at 100° C. The reactor was cooled to 25° C. and 10.0 cc of a 4.0 wt % toluene solution of methylalumoxane was injected along with 100 cc of distilled toluene at 0 psig under nitrogen. Liquid propylene monomer (200 cc) was added from a calibrated burette at 25° C. The reactor contents were stirred and heated to 115° C. at which point the reactor pressure was 375 psig. 1.00 cc of a toluene solution of bis(n-butylcyclopentadienyl) zirconium dichloride (1.00 mg) was injected and ethylene at a pressure of 405 psig was immediately supplied. Ethylene was fed on pressure demand in order to keep the system pressure at 405 psig. The rate of ethylene flow was recorded continuously during the course of the polymerization. The reaction was continued for 15 minutes after which the reaction was stopped by rapidly depressuring and cooling the reactor to 25° C. The polymer product was collected and the toluene solvent was evaporated in an air stream. The polymer weight was determined to be 103.1 gms, and the polymer was analyzed by size-exclusion chromatography and found to contain 68 wt % ethylene and to have a number average molecular weight of 1100, a weight average molecular weight of 5400 and a polydispersity of 4.9. The polymer product was found to contain 2.5 wppm Zr and 1.75 wppm Cl.

EXAMPLE 2

Preparation of Ethylene-Propylene Copolymer

The polymerization was performed as in Example 1 except that the reactor temperature was maintained at 100° C. and 1.00 mg of dimethyl-silyldicyclopentadienyl zirconium dichloride was used as catalyst instead of bis(n-butylcyclopentadienyl) zirconium dichloride. The reactor pressure was maintained at 380 psig by a regulated ethylene supply. The yield of the copolymer was 111.2 gms and the polymer was determined to contain the ethylene content indicated in Table I and to have a number average molecular weight of 1390, a weight average molecular weight of 4030 and polydispersity of 2.9. The polymer product was found to contain 2.0 wppm Zr and 1.5 wppm Cl.

EXAMPLE 3

Preparation of Ethylene-Propylene Copolymer

The polymerization was performed as in Example 2 except that the reactor temperature was maintained at 90° C. and 270 cc of liquid propylene was charged. The reactor pressure was maintained by a regulated ethylene supply. The yield of the copolymer was 16.3 gms and the polymer was determined to contain the ethylene content indicated in Table I and to have a number average molecular weight of 1750, a weight average molecular weight of 4960 and polydispersity of 2.8. The polymer product was found to contain 16 wppm Zr and 10 wppm Cl.

EXAMPLE 4

Preparation of Ethylene-Propylene Copolymer

The polymerization was performed as in Example 3 except that the reactor temperature was maintained at 80° C. The reactor pressure was maintained at 365 psig by a regulated ethylene supply for 1 hour. The yield of the copolymer was 234 gms and the polymer was determined to have a number average molecular weight of 2710, a weight average molecular weight of 7980 and polydispersity of 2.9. The polymer product was found to contain the ethylene content indicated in Table I and to contain 1.0 wppm Zr and 0.7 wppm Cl.

EXAMPLE 5

Preparation of Ethylene Butene-1 Copolymer

The polymerization was performed as in Example 3 except that 270 cc of liquid butene-1 was charged instead of the propylene. The reactor pressure was maintained at 167 psig by a regulated ethylene supply. The yield of the copolymer was 176.6 gms and the polymer was determined to have a number average molecular weight of 860, a weight average molecular weight of 2710 and polydispersity of 3.1. The polymer product was found to contain 1.5 wppm Zr and 1.1 wppm Cl.

EXAMPLES 6–10

Preparation of Ethylene-Propylene Copolymer Substituted Succinic Anhydride (EPSA)

In a series of runs, the selected moles of the EP copolymers prepared as above and pulverized maleic anhydride are charged under dry $N_2$ at atmospheric pressure to a 100 ml. pressure reactor equipped with a stirrer and a thermocouple and heated by means of an electric heating mantle. No added solvent or diluent for the reactants is employed. Rather the reaction is conducted in the melt. In each run, the reaction mixture is heated to 70° C. and the reactor is gently purged with dry $N_2$ by bubbling through the liquid reaction mass for 15 minutes. The purging is then ceased and the reactor temperature is raised to 220° C. and kept at that temperature under autogenous pressure for 4 hours while stirring. The liquid reaction mixture is then cooled to about 60° C., and transferred to a glass beaker. Dry gaseous nitrogen is passed through the liquid to strip off unreacted maleic anhydride at about 140° C. until no trace of maleic anhydride is detected with IR. The liquid product containing the EPSA and unreacted EP is analyzed for succinic anhydride by the following titration technique: a 2 g. sample of the polymer is dissolved in a solvent comprising 80 ml of THF, 6 ml of pyridine and 0.3 ml of water and titrated with a methanol solution of tetrabutyl ammonium hydroxide using thymol blue to a color end point. The acidity is calculated from the milliliters of base solution used. The product is also observed to determine the presence of any sediment.

In Example 11, the procedure of Example 6 is repeated except that the polymer was charged comprised a 50:50 wt:wt mixture of the ethylene-propylene copolymer prepared as in Example 4 ($M_n$=2710), and the polyisobutylene polymer which is employed in Comparative Example 13 ($M_n$=1300). The data thereby obtained are the mole ratio of polymer and maleic anhydride charged, and the data thereby obtained are summarized in Table I.

TABLE I

| | | Feed | | Titration of Succinic Acid in the EPSA (or EP/PIB-SA) Product, Meq/gram | | | |
|---|---|---|---|---|---|---|---|
| | | Copolymer As Prepared In | Mol. Ratio of of EP to MA | | | | |
| Example | EP Copolymer | Example | Charged | Theor. | Found | % Conv. (3) | Sediment (4) |
| 6 | $\bar{M}_n$ = 1100<br>68 wt. % $C_2^=$ | 1 | 1/1.2 | 0.91 | 0.73 | 80.3 | moderate |
| 7 | $\bar{M}_n$ = 1390<br>56 wt. % $C_2^=$ | 2 | 1/1.2 | 0.72 | 0.65 | 89.3 | moderate |
| 8 | $\bar{M}_n$ = 1750<br>59 wt. % $C_2^=$ | 3 | 1/1.2 | 0.57 | 0.43 | 75.4 | none |
| 9 | $\bar{M}_n$ = 2710<br>55 wt. % $C_2^=$ | 4 | 1/1.2 | 0.37 | 0.31 | 83.8 | none |
| 10 | $\bar{M}_n$ = 2710<br>55 wt. % $C_2^=$ | 4 | 1/3.2 | 0.37 | 0.56 | 150 | slight |
| 11 | (1) | 4(EP)<br>Comp.13 (PIB) | (2) | 0.6 | 0.52 | 86.7 | some |

NOTES:
EP - ethylene-propylene copolymer; PIB = polyisobutylene; MA = maleic anhydride.
(1) EP $\bar{M}_n$ = 2710, 55 wt. % $C_2^=$; PIB $\bar{M}_n$ = 1200.
(2) (EP + PIB)/MA = 1.0:1.2 mole ratio charged.
(3) Based on (theoretical - found) meq/gm SA.
(4) Low amounts of sediment not quantified.

COMPARATIVE EXAMPLES 12–14

To determine the degree of sediment formed in maleic anhydride reactions with conventional polyisobutylene polymers and conventional ethylene-propylene copolymers, the above procedure is repeated in a series of runs. The polyisobutylene polymer employed in Comparative Example 12 comprises Parapol 1300 polymer (Exxon Chemical Americas), and the polyisobutylene polymer employed in Comparative Example 13 comprises reactive polyisobutylene (ultra Vis30; BP Chemicals), having about 0.58 mole of terminal double bonds per mole of polymer (as determined by NMR) and a molecular weight distribution of about 3.0 (based on GPC). The ethylene-propylene copolymer of Comparative Example 14 (42 wt % ethylene, 58 wt % propylene; $\bar{M}_n$=1060; $\bar{M}_w$=1903) is prepared by conventional Ziegler Natta catalysis of ethylene and propylene using a catalyst system comprising $VOCl_3$ and aluminum sesquichloride, with $H_2$ as molecular weight control. The data thereby obtained are summarized in Table II.

The above results illustrate the surprisingly reduced sediment formation and high conversions achieved in the thermal "ene" reaction of maleic anhydride and the ethylene-propylene copolymers in accordance with the process of this invention in Examples 6–10, as compared to conventional polyisobutylene polymers (Comparative Examples 12–13) and conventional ethylene-propylene copolymers (Comparative Example 14).

EXAMPLES 15–20; COMPARATIVE EXAMPLES 21–22

Preparation of Polyamine Dispersants

A series of dispersant materials are prepared employing the EPSA products prepared as in Examples 9 and 10, the mixed (EP/PIB)SA product of Example 11, the PIBSA product of Comparative Example 14, and various blends of the above PIBSA and EPSA products.

The succinic acid anhydride substituted polymers are dissolved in an equal amount by weight of a mineral oil, S150N. To the polymer solution is added a mixture of polyethylene polyamines having the average composition corresponding to tetraethylene pentamine and containing about 32.6 wt % N (PAM) and the mixture is heated to 140° C. under nitrogen while stirring for about 2 to 4 hours. In each run, the molar ratio of total polymer to polyamine in terms of succinic acid equivalents to PAM charged is 2 to 1.

TABLE II

| | Feed | | Titration of Succinic Acid in the PIBSA (or EPSA) Reaction Product Mixture, Meq/gram | | | |
|---|---|---|---|---|---|---|
| Comparative Example | Polymer (Mn) | Mol. Ratio of PIB or EP to MA | Theor. | Found | % Conv. (1) | Sediment (2) |
| 12 | PIB (1300) | 1/1.2 | 0.77 | 0.34 | 44.2 | heavy (2) |
| 13 | PIB (1200) | 1/1.2 | 0.83 | 0.47 | 56.4 | heavy (2) |
| 14 | EP (1060) | 1/1.2 | 0.94 | 0.15 | 16.0 | none |

Notes:
EP - ethylene-propylene copolymer; PIB = polyisobutylene; MA = maleic anhydride.
(1) Calculated as in Table I.
(2) Sediment (1.24 wt. % and 0.36 wt. % based on PIB charged) found in Examples 12 and 13, respectively, as hexane insoluble solids on reaction vessel bottom.

Viscosities of the resulting dispersant solutions are determined. Results of the viscometric studies are summarized in Table III below.

EXAMPLE 28

Ethylene-propylene copolymer ($\overline{M}_n$=1100) prepared as in Example 1 is reacted thermally with maleic anhydride as in

TABLE III

| Example | Polymer in S150N, | SA-Polymer/ Amine Mole Ratio (1) | % N Estimated in the Product Solution | Viscometrics KV 100° C. cSt | CCS −20° C., p | VR' (2) |
|---|---|---|---|---|---|---|
| 15 | EPSA from Ex. 10 | 2/1 | 0.88 | 7.44 | 23.14 | 3.11 |
| 16 | A Mix of 20% EPSA from Ex. 10 and 80% PIBSA from Comp. Ex. | 2/1 | 0.78 | 6.38 | 24.58 | 3.85 |
| 17 | A Mix of 50% EPSA from Ex. 10 and 50% PIBSA from Comp. Ex. 14 | 2/1 | 0.79 | 6.75 | 24.29 | 3.60 |
| 18 | A Mix of 50% PIBSA from Comp. Ex. 13 and 50% EPSA from Ex. 9 | 2/1 | 0.66 | 7.52 | 28.26 | 3.76 |
| 19 | A Mix of 50% PIBSA from Comp. Ex. 13 and 50% EPSA from Ex. 10 | 2/1 | 0.80 | 8.11 | 28.86 | 3.56 |
| 20 | (A 50/50 Mix of EP and PIB) SA from Ex. 11 | 2/1 | 0.82 | 6.43 | 23.42 | 3.64 |
| Comp. 21 | PIBSA from Comp. Ex. 14 | 2/1 | 0.73 | 6.20 | 24.65 | 4.0 |
| Comp. 22 | Control | None | 0 | 5.19 | 19.20 | 3.70 |

Notes:
(1) Mole ratio of polymer (calculated in terms of mole of contained succinic acid/anhydride groups) per mole of polyamine charged.
(2) VR' = [CCS, −20° C., poise]/[KV 100° C. cSt].

EXAMPLES 25–26: COMPARATIVE EXAMPLE 27

A series of dispersant blends are prepared employing the dispersant product solutions made as in Example 15 and Comparative Example 21, and the viscometrics measured, as summarized in Table IV below:

TABLE IV

| Example | Blend of Dispersant Dispersant | Wt. % | Viscometrics KV 100° C. cStcSt | CCS −20° C., p | VR' |
|---|---|---|---|---|---|
| 25 | Ex, 15 | 20 | 6.44 | 24.80 | 3.85 |
|  | Comp.Ex.21 | 80 |  |  |  |
| 26 | Ex. 15 | 50 | 6.82 | 24.29 | 3.56 |
|  | Comp.Ex.21 | 50 |  |  |  |
| Comp.27 | Comp.Ex.21 | — | 6.20 | 24.65 | 4.0 |
| — | Reference Oil | 0 | 5.19 | 19.20 | 3.70 |

The lower VR' values signify a better viscometric balance that is desirable for dispersant to have. Results show that the viscometric behavior of PIB-based dispersants can be improved, as indicated by lower VR' values, by means of blending with the EP-copolymer based dispersants of this invention and also by making polyamine dispersants from a mix of PIBSA and EPSA dispersant intermediates. Moreover, the above results indicate that the VR' values for the dispersant product solutions of Examples 25–26, unlike the comparative dispersant of Comparative Example 27, are lower than the VR, value for the reference oil itself.

Example 6 to give an EPSA product (% AI.54.5) which is diluted with an equal amount of S150N to give a 50 wt. % polymer solution. To 25 g of the solution, 0.75 g of the PAM (wt % N=32.6) is added dropwise while stirring and light $N_2$ sparging at 140° C. for 2 hours followed by nitrogen stripping for an hour at 140° C.

The resulting composition is then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test is a used crankcase mineral lubricating oil composition having an original viscosity of about 325 SUS at 38_C that had been used in a taxicab that is driven generally for short trips only, thereby causing a buildup of a high concentration of sludge precursors. The oil that is used contains only a refined base mineral lubricating oil, a viscosity index improver, a pour point depressant and zinc dialkyldithiophosphate anti-wear additive. The oil contains no sludge dispersant. A quantity of such used oil is acquired by draining and refilling the taxicab crankcase at 1000–2000 mile intervals.

The SIB test is conducted in the following manner: the aforesaid used crankcase oil, which is milky brown in color, is freed of sludge by centrifuging for one hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, of the particular additive being tested. Ten grams of each blend being tested are placed in a stainless steel centrifuge tube and are heated at 135° C. for 16 hours in the presence of air. Following the heating, the tube containing the oil being tested is cooled and then centrifuged for about 30 minutes at room temperature at about 39,000 gs. Any deposits of new sludge that form in this step are separated from the oil by decanting the supernatant oil and then carefully washing the sludge deposits with 25 ml of heptane to remove all remaining oil from the sludge and further centrifuging. The weight of the new solid sludge that has been formed in the test, in milligrams, is determined by drying the residue and weighing it. The results are reported as amount of precipitated sludge in comparison with the precipitated sludge of a blank not containing any additional additive, which blank is normalized to a rating of 10. The less new sludge precipitated in the presence of the additive, the lower the SIB value and the more effective is the additive as a sludge dispersant. In other words, if the additive gives half as much precipitated sludge as the blank, then it would be rated 5.0 since the blank will be normalized to 10.

The VIB test is used to determine varnish inhibition. Here, the test sample consists of 10 grams of lubricating oil containing a small amount of the additive being tested. The test oil to which the additive is admixed is of the same type as used in the above-described SIB test. The ten gram sample is heat soaked overnight at about 140° C. and thereafter centrifuged to remove the sludge. The supernatant fluid of the sample is subjected to heat cycling from about 150° C. to room temperature over a period of 3.5 hours at a frequency of about 2 cycles per minute. During the heating phase, gas which was a mixture of about 0.7 volume percent $SO_2$, 1.4 volume percent NO and balance air is bubbled through the test sample. During the cooling phase, water vapor is bubbled through the test sample. At the end of the test period, which testing cycle can be repeated as necessary to determine the inhibiting effect of any additive, the wall surfaces of the test flask in which the sample is contained are visually evaluated as to the varnish inhibition. The amount of varnish imposed on the walls is rated to values of from 1 to 11 with the higher number being the greater amount of varnish, in comparison with a blank with no additive that was rated 11.

10.00 grams of SIB test oil are mixed with 0.05 grams of the products of the Examples as described in Table II and tested in the aforedescribed SIB and VIB tests.

The test results are summarized below in Table V.

TABLE V

| Example | wt % A.I. | SIB, mg | VIB rating | KV, 100° C., cs | CCS, −20° C. p | VR' |
| --- | --- | --- | --- | --- | --- | --- |
| 28 | 28.3 | 7.54 | 2.3 | 6.47 | 22.61 | 3.50 |
| Control A (1) | 0 | 10.0 | 10.0 | 5.19 | 19.20 | 3.70 |
| Control B (2) | 45 | 4.74 | 4 | 6.22 | 25.40 | 4.08 |
| Control C (3) | 32 | 5.43 | 7 | 5.89 | 24.12 | 4.10 |

Notes:
(1) Blank S150N oil, no dispersant.
(2) Polyisobutylene succinimide prepared from 2250 $\bar{M}_n$ PIB.
(3) Polyisobutylene succinimide prepared from 1300 $\bar{M}_n$ PIB.

EXAMPLES 29–34

The procedure of Example 28 is repeated in a series of runs to prepare additional dispersant product solutions. The results thereby obtained, and the EPSA's employed, are summarized in Table VI.

TABLE VI

| Example No. | EPSA Product as Prepared in Ex. No. | EP $M_n$ | SA-Polymer/PAM Mole Ratio(1) | Wt. % N(2) | SIB (mg) | VIB Rating | KV 100° C. cSt | CCS −20° C. p | VR' |
| --- | --- | --- | --- | --- | --- | --- | --- | --- | --- |
| 29 | 6 | 1100 | 1.6 | 1.25 | 3.08 | 3 | 6.84 | 23.79 | 3.5 |
| 30 | 7 | 1390 | 1.6 | 1.22 | 1.79 | 4–5 | 6.09 | 24.23 | 4.0 |
| 31 | 8 | 1750 | 1.6 | 0.83 | 4.36 | 4 | 6.60 | 24.30 | 3.7 |
| 32 | 9 | 2710 | 1.6 | 0.59 | 5.64 | 3 | 6.89 | 24.23 | 3.5 |
| 33 | 8 | 1750 | 2.0 | 0.75 | — | — | 6.62 | 23.63 | 3.6 |
| 34 | 10 | 2710 | 2.0 | 0.88 | — | — | 7.44 | 23.14 | 3.11 |
| S150N Oil | — | — | — | — | 10 | 11 | 5.19 | 19.2 | 3.7 |

Notes:
(1) Mole ratio of polymer (calculated in terms of mole of contained succinic acid/anhydride groups) per mole of polyamine charged.
(2) Estimated wt. % N in the dispersant material product solutions.

EXAMPLE 35

The procedure of Example 6 is repeated except that 1 mole of ethylene-butene-1 copolymer ($M_n$=860) prepared as in Example 5 is employed instead of the ethylene-propylene copolymer. The ethylene butene copolymer-substituted succinic anhydride (EBSA) product thereby obtained is found to contain about 76 wt % active ingredient EBSA and less than about 1 wppm of chlorine and to have a VR ratio of 3.9 (KV at 100° C.=5.77 cSt; CCS at −20° C.=22.63 poise).

EXAMPLES 36–39

In a separate series of runs, additional dispersants are prepared by employing the EPSA products of Examples 6, 7, 8 and 9 and the EBSA products of Example 35.

An amido amine ("AA") is prepared by reacting tetraethylene pentamine (TEPA) with methyl acrylate at a 1.5:1 TEPA:methyl acrylate molar ratio, to form a product mixture containing 29.3 wt. % total N, 6.1 wt. % primary N, and about 25 wt. % unreacted TEPA.

A mixture of 10 parts by weight of the EPSA (or EBSA) product formed in the indicated Example and 10 parts of S150N mineral oil are heated to 150° C. under $N_2$. Then the desired amount of amido-amine prepared as above are added dropwise while stirring and light nitrogen sparging. The mixture is nitrogen stripped at 150° C. for 3 hours and then filtered. The dispersant product solution is found to have the nitrogen content and kinematic viscosity reported in Table VII.

Each dispersant product solution is then tested as described in Examples 29–34 in the SIB and VIB tests. The results thereby obtained are also set forth in Table VII.

TABLE VII

| Example No. | 36 | 37 | 38 | 39 | 40 |
|---|---|---|---|---|---|
| EPSA as in Ex. | 6 | 7 | 8 | 9 | — |
| EP $\bar{M}_n$ | 1100 | 1390 | 1750 | 2710 | — |
| EBSA as in Ex. | — | — | — | — | 35 |
| EB $\bar{M}_n$ | — | — | — | — | 860 |
| Dispersant (1) | | | | | |
| SA/AA (2) | 1.2 | 1.2 | 1.2 | 1.2 | 1.2 |
| Wt. % N (3) | 1.66 | 1.41 | 0.98 | 0.70 | 1.28 |
| Wt. % AI | 42 | 45 | 43.4 | 35.5 | — |
| SIB, mg | 2.7 | 1.13 | 3.18 | 4.51 | 0.8 |
| VIB rating | 3 | 3–4 | 4 | 4 | 4–5 |
| KV, 100° C., cSt | 6.76 | 6.08 | 6.60 | 6.92 | 6.12 |
| CCS, -20° C., p | 22.49 | 23.06 | 23.62 | 23.95 | 24.00 |
| VR', p/cSt | 3.3 | 3.8 | 3.6 | 3.5 | 3.9 |
| VR'/VR$_r$(4) | 0.89 | 1.03 | 0.97 | 0.95 | 1.05 |

NOTES:
(1) Dispersant product admixed with equal weight of S150N oil.
(2) Mole ratio of EPSA (or EBSA), calculated as moles of SA (succinic anhydride) per equivalent of primary amine.
(3) Estimated N content of dispersant product.
(4) VR$_r$ = 3.7

EXAMPLE 40

About 73.5 grams Uniroyal Trilene® 65 ethylene/propylene/di-cyclopentadiene semiliquid terpolymer having a Brookfield viscosity of 67,000 centipoise at 100° C., 9.0 wt. % cyclopentadiene, and an ethylene:propylene monomer ratio of 48/52 was dissolved in 76.4 grams 150N oil in a 300 ml Parr reactor. About 9.8 grams maleic anhydride was added; the reactor was N$_2$ purged and heated at 250° C. for eight hours. The product was heated in a kugelrohr at 180° C. and 0.1 mm Hg to remove excess maleic anhydride.

The saponification equivalent of the purified product was 48 mg KOH per gram (96 KVH/gram on active ingredient basis).

About 16.2 grams of the above maleated product in 19 grams xylene was heated with 2.04 grams dimethyl aminopropyl amine at 60° C. for two hours. The excess xylene and amine were partially removed by N$_2$ purge at 160° C. and purified in a Kugelrohr at 160° C. and 0.4 mm Hg.

Elemental analysis indicated 2.128 wt. % nitrogen for the polymer product.

We claim:

1. A functionalized polymer comprising an ethylene/alpha-olefin/diene interpolymer substituted with monounsaturated mono- or dicarboxylic acid-producing moieties, said interpolymer having (i) monomer units derived from ethylene, at least one alpha-olefin of the formula H$_2$C=CHR$^1$ wherein R$^1$ is a C$_1$–C$_{18}$ alkyl group, and at least one diene monomer; (ii) a $\bar{M}_n$ of about 300–20,000; (iii) at least about 30% of its chains with ethenylidene terminal unsaturation; and (iv) less than 5 wt. % polymer fraction of $\bar{M}_n$ less than about 300;

said functionalized polymer having a VR value of less than about 4.1.

2. The functionalized polymer of claim 1 wherein said interpolymer is functionalized by "ene" reaction.

3. The functionalized polymer of claim 1 wherein said acid-producing moieties are C$_3$–C$_{10}$ monounsaturated monocarboxylic acid-producing moieties, C$_4$–C$_{10}$ monounsaturated dicarboxylic acid-producing moieties, or derivatives thereof.

4. The functionalized polymer of claim 1 wherein said interpolymer has a molar ethylene content of about 20–80%.

5. The functionalized polymer of claim 1 wherein said alpha-olefin is propylene or butene.

6. The functionalized polymer of claim 1 wherein said acid-producing moieties are maleic anhydride or derived therefrom.

7. The functionalized polymer of claim 1 wherein said at least one diene monomer comprises at least one of cyclopentadiene, 5-ethylidene-2-norbornene, 1,4-hexadiene, vinyl norbornene, norbornadiene, and methyl hexadiene.

8. A lubricating oil concentrate containing about 10–80 wt. % of the functionalized polymer of claim 1.

9. A lubricating oil composition containing about 5–70 wt. % of the functionalized polymer of claim 1.

* * * * *